United States Patent
Nandi et al.

(10) Patent No.: US 12,360,787 B2
(45) Date of Patent: Jul. 15, 2025

(54) CONTEXT-DEPENDENT DIGITAL ACTION-ASSISTANCE TOOL

(71) Applicant: Microsoft Technology Licensing, LLC, Redmond, WA (US)

(72) Inventors: Ajoy Nandi, Redmond, WA (US); Jason T Creighton, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/190,805

(22) Filed: Mar. 27, 2023

(65) Prior Publication Data

US 2023/0236859 A1   Jul. 27, 2023

Related U.S. Application Data

(63) Continuation of application No. 15/183,675, filed on Jun. 15, 2016, now abandoned.

(51) Int. Cl.
| | |
|---|---|
| *G06F 9/451* | (2018.01) |
| *G06F 11/34* | (2006.01) |
| *G06F 16/2455* | (2019.01) |
| *G06F 16/28* | (2019.01) |
| *G06F 16/332* | (2025.01) |
| *G06F 16/9032* | (2019.01) |
| *G06F 16/9535* | (2019.01) |
| *H04L 67/50* | (2022.01) |

(52) U.S. Cl.
CPC .......... *G06F 9/453* (2018.02); *G06F 11/3438* (2013.01); *G06F 16/24565* (2019.01); *G06F 16/287* (2019.01); *G06F 16/3322* (2019.01); *G06F 16/90324* (2019.01); *G06F 16/9535* (2019.01); *H04L 67/535* (2022.05)

(58) Field of Classification Search
CPC .. G06F 9/453; G06F 16/24565; G06F 16/287; G06F 16/3322; G06F 16/90324; G06F 16/9535; G06F 11/3438; H04L 67/535
See application file for complete search history.

(56) References Cited

U.S. PATENT DOCUMENTS

| | | | |
|---|---|---|---|
| 9,147,001 B1 * | 9/2015 | Brewington | ...... G06F 16/24575 |
| 2007/0162424 A1 * | 7/2007 | Jeh | ...................... G06F 16/9538 |

(Continued)

*Primary Examiner* — Nicholas Ulrich
(74) *Attorney, Agent, or Firm* — Shook, Hardy & Bacon L.L.P.

(57) ABSTRACT

A computer-implemented technique is described herein for facilitating a user's repeated execution of the same computer-implemented actions. The technique performs this task by determining patterns in the manner in which the user repeats requests associated with certain computer-implemented actions. For example, the technique determines context-dependent patterns in the manner in which the user submits search requests to a search system. The technique then leverages those patterns by proactively providing a request-assistance tool to the user in those context-specific circumstances in which the user is likely to perform the repetitive computer-implemented actions. The digital action-assistance tool provides various kinds of assistance to the user in performing the repetitive computer-implemented actions.

20 Claims, 11 Drawing Sheets

(56) References Cited

U.S. PATENT DOCUMENTS

| | | | |
|---|---|---|---|
| 2008/0082518 A1* | 4/2008 | Loftesness | G06Q 10/02 707/999.005 |
| 2009/0089368 A1* | 4/2009 | Fujiwara | G06F 3/04842 709/203 |
| 2014/0214895 A1* | 7/2014 | Higgins | G06F 16/9535 707/770 |
| 2016/0066864 A1* | 3/2016 | Frieder | H04W 52/0229 600/300 |

* cited by examiner

CONTEXT-DEPENDENT DIGITAL ACTION-ASSISTANCE TOOL

CROSS-REFERENCE TO RELATED APPLICATION

This application is a continuation of U.S. patent application Ser. No. 15/183,675, filed on Jun. 15, 2016. The entire contents of which are incorporated herein in their entirety.

BACKGROUND

Users interact with search engines in a wide variety of circumstances. In traditional practice, a user encounters a need for information, accesses an interface page provided by a search engine, and manually enters his or her search terms via the interface page. In response, the search engine provides a list of search results to the user. In certain cases, a user may repeat the same inquiry on different occasions. For instance, a user may retrieve the same kind of stock quote information from a finance-related website on a periodic basis. The user's interaction with other systems may exhibit similar behavioural characteristics.

SUMMARY

A computer-implemented technique is described herein for facilitating a user's repeated execution of the same computer-implemented actions. The technique performs this task by determining patterns in the manner in which the user repeats requests associated with certain computer-implemented actions. For example, the technique determines context-dependent patterns in the manner in which the user submits search requests to a search system. The technique then leverages those patterns by proactively providing a digital action-assistance tool to the user in those context-specific circumstances in which the user is likely to perform the repetitive requests.

In one search-related scenario, the action-assistance tool can present one or more contextually relevant search requests (e.g., search queries) to the user. The user may activate any one of the search requests to retrieve an associated result item, such as a particular information item. Alternatively, or in addition, the action-assistance tool can proactively present one or more result items without requiring the user to explicitly activate the search request(s) associated with those items.

The technique proactively sends the action-assistance tool to the user device by sending the tool without requiring the user to manually input whatever request(s) are associated with the action-assistance tool. According to one advantage, the technique facilitates and expedites the user's execution of computer-implemented actions (such as search operations) that he or she performs on a predictable basis, such as a predictable periodic basis or a predictable event-driven basis. As a complementary advantage, the technique also reduces the utilization of system resources. In other words, insofar as the technique reduces the amount of input operations taken by the user, it also reduces the system resources that would otherwise be required to process the user's input actions. For example, the technique can eliminate or reduce the processing load that would otherwise be required to automatically process a manually input search request.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

To FIG. 1 shows an environment for proactively presenting a digital action-assistance tool ("action-assistance tool") to a user, for facilitating a user's execution of certain repetitive computer-implemented actions.

Figure 1:
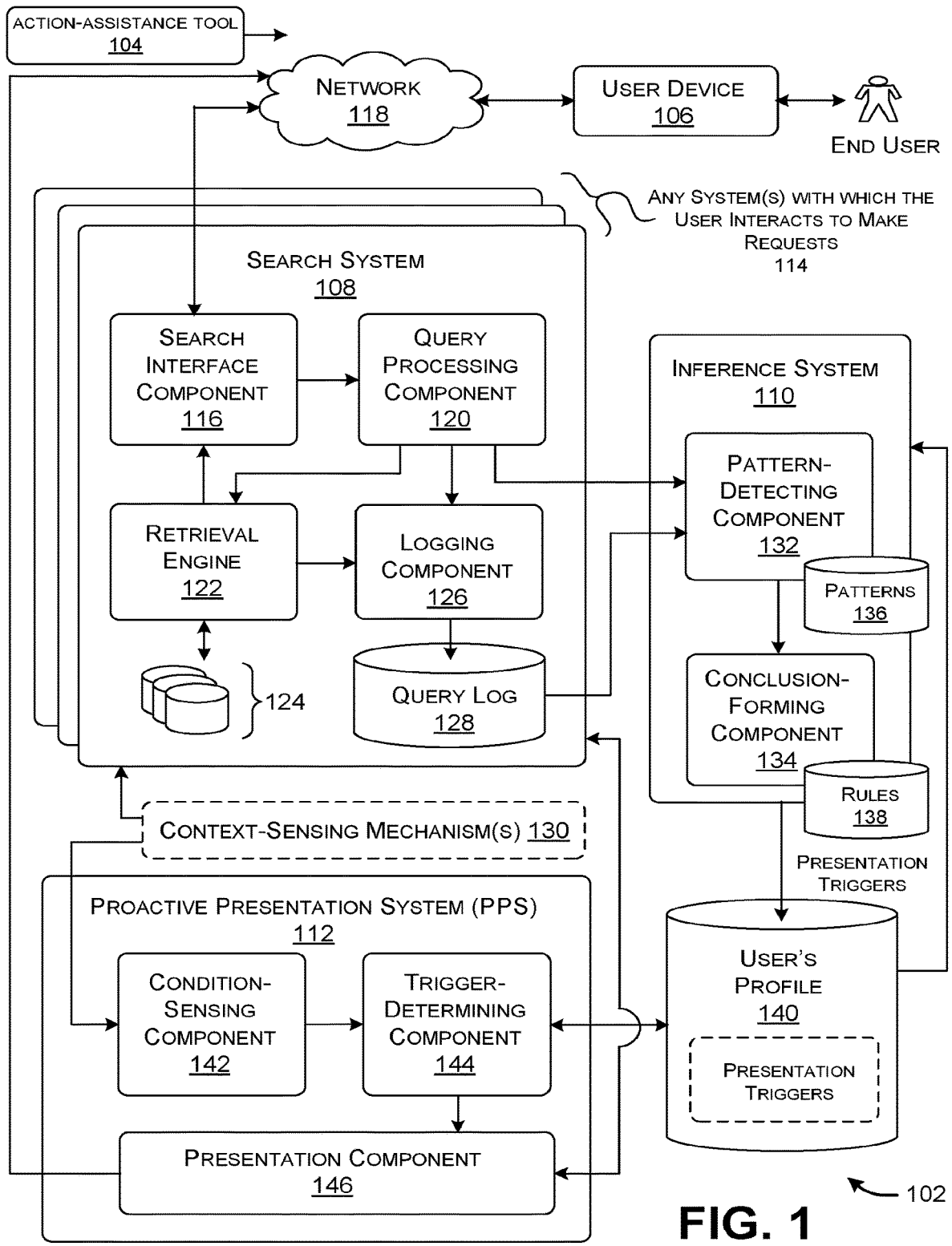

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented environment for assisting a user in performing repeated requests associated with certain repeated computer-implemented actions. Section B sets forth illustrative methods that explain the operation of the system of Section A.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Subsection A.3 provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows an environment 102 for proactively providing a digital request-assistance tool 104 (henceforth referred to as an "action-assistance tool" for brevity) to a user device 106, operated by a user. The action-assistance tool 104 assists the user in carrying out a request that he or she performs on a predictable basis. In general, the user makes the request to commence a computer-implemented action. Or the request otherwise represents a part of the computer-implemented action. For instance, in some cases, the computer-implemented action corresponds to an information retrieval-related action. Here, the user makes a search request on a predictable basis to access some kind of information item, such as a finance-related item (e.g., a monetary conversion rate), a weather-related item, a shopping-related item, and so on.

In other cases, the computer-implemented action corresponds to a service-related action. Here, the user makes a service-related request on a predictable basis in the course of his or her interaction with an application or system of any type, such as a communication application, a shopping-related application, a calendar-related application, and so on. For example, the user may make such as request to activate a particular service. Or the user may make such a request to control or otherwise interact with the particular service once it is activated.

To facilitate description, but without limitation, the following explanation will set forth the operation of the environment mainly in the context of information-related search requests. In that context, the action-assistance tool 104 provides a representation of a context-specific search request and/or a corresponding information item, without requiring the user to manually enter the search request or manually hunt for the information item. In doing so, the action-assistance tool 104 reduces the number and/or complexity of input actions required by the user. As a complementary benefit, the action-assistance tool 104 also reduces the system resources that the environment 102 would otherwise expend in processing the user's input actions. For example, the technique can eliminate or reduce the processing load that would otherwise be required to automatically process a search request, e.g., by eliminating the need for the environment 102 to interpret and search the search request provided by the user as he or she manually types it. The environment 102 achieves similar advantages in other scenarios. For instance, in a service-related context, the action-assistance tool 104 can reduce the number and/or complexity of input actions that the user is expected to perform in interacting with a service of any type.

FIG. 1 shows that the environment 102 includes three main components: a search system 108, an inference system 110, and a proactive presentation system (PPS) 112. Each such component will be described in turn below. Note that the following description explains the components of the environment 102 in the context of the environment's interaction with a single user. But the environment 102 can provide its service to any number of users who interact with the environment 102 via any respective user devices (not shown). Each user device may correspond to any type of computing mechanism, such as a traditional stationary personal computing device, any type of portable computing device (e.g., a tablet-type computing device, a smartphone, a wearable computing device, etc.), and so on.

Search System

The search system 108 can correspond to any commercial or custom-built search system. For instance, the search system 108 may correspond to the BING search system provided by MICROSOFT Corporation of Redmond, Wash. The search system 108 receives a search request (e.g., a query) from the user device 106, and, in response, provides search results to the user device 106. In some cases, the user may directly interact with the search system 108. In other cases, the user may indirectly interact with the search system 108 through an intermediary system. For example, the user may use the user device 106 to interact with a personal digital assistant (PDA) system, such as the CORTANA system provided by MICROSOFT Corporation. In the course of processing the user's input utterances, the PDA system can submit a request to the search system 108. In another example, the user may interact with a game console and associated gaming system. In the course of processing the user's input actions, the gaming system can submit a request to the search system 108.

More generally, the search system 108 represents one system in a set of possible systems 114 that receive requests from the user and provide corresponding responses (as conveyed by one or more result items). For example, another kind of system (not specifically shown in FIG. 1) can include search functionality associated with a particular software product or service. For example, one such system can correspond to a word processing system; that system receives the user's request for a document and, in response, provides a corresponding list of documents that match the user's request. Another system can correspond to a merchandising system; that system receives the user's request for a product item, and, in response, provides a corresponding list of product-related items that match the user's request, and so on.

In yet other cases, a system can provide any kind of service in response to the user's request. For example, one such system can correspond to a communication application; that system responds to the user's requests by performing various communication-related operations in various context-specific circumstances, such as sending messages, organizing messages, etc. Another system can correspond to an online trading application; that system responds to the user's requests by making various trades in context-specific circumstances, and so on. The environment 102 can process requests produced by any of the above-described systems 114. However, to simplify the explanation, the following description will emphasize the representative case in which the search system 108 shown in FIG. 1 is the primary source of requests, and the requests pertain to queries for information.

The search system 108 includes a search interface component 116 for providing one or more user interface presentations to the user. For instance, the search interface component 116 provides one or more user interface presentations that allow a user to input a search request (i.e., a query). The search interface component 116 also provides one more user interface presentations that provide the search results to a user. The user device 106 may interact with the search interface component 116 via a computer network 118, such as a wide area network (e.g., the Internet), a local area network, one or more point-to-point links, and so on, or any combination thereof.

A query processing component 120 interprets each search request submitted by the user via the search interface component 116, to provide an interpreted request. The query processing component 120 can use different functionality to perform this task. In one case, the query processing component 120 can use a deep-learning machine-trained neural network to map each original search request into an interpreted request. The interpreted request corresponds to a concept vector, which expresses the semantic meaning of the query. Two queries may map to the same (or similar) concept vector, despite the fact that they have different lexical forms (e.g., even though they use different keywords).

In another case, the query processing component 120 is provided by a PDA system, and it interprets utterances submitted by the user to the PDA system. In that context, the query processing component 120 can include a series of models to transform the query into the interpreted request. For example, the query processing component 120 can use a domain model, an intent model, and a slot analysis model.

The domain model determines the most probable domain associated with an input utterance. A domain pertains to the general theme to which an input utterance pertains, which may collectively correspond to a set of tasks handled by a particular application, or a subset of those tasks. The intent model determines an intent associated with the input utterance. An intent corresponds to an objective that a user likely wishes to accomplish by submitting an input utterance. For example, a user who submits the command "find Mission Impossible" intends to find a particular movie having the name of "Mission Impossible." The slot analysis model determines slot values in the input utterance. The slot values correspond to information items that an application needs to perform a requested task, upon interpretation of the input utterance. For example, the command, "find Jack Nicolson movies in the comedy genre" includes a slot value "Jack Nicolson," that identifies an actor having the name of "Jack Nicolson," and a slot value "comedy," corresponding to a requested genre of movies. Each of these models can be implemented by any kind of statistical machine-learned model and/or a rule-application engine. For example, the query processing component 120 can implement the domain model and the intent model as respective neural networks. The query processing component 120 can implement the slot analysis model as a conditional random field (CRF) model.

A retrieval engine 122 generates search results in response to the interpreted request provided by the query processing component 120. In one merely illustrative case, the retrieval engine 122 can compare the interpreted request with each information item provided in a repository 124 of searchable information. For instance, with respect to a particular information item (e.g., a document) under consideration, the retrieval engine 122 can generate multiple feature values that describe the interpreted request and the particular information item (and other context-based metadata values). The retrieval engine 122 can then use a machine-trained statistical model (such as a neural network) to determine the relevance of the particular information item to the interpreted query, based on the input feature values. Overall, the retrieval engine 122 can provide a list of information items having the highest-ranking scores, selected from among the information items in the repository 124.

A logging component 126 stores information regarding each request that has been submitted to the search system 108 in a data store 128. For example, the logging component 126 can store the original request, the interpreted request, context information (described below), and any or all information items identified by the retrieval engine 122. The logging component 126 can also store the user's response to the information items, such as by storing an indication of whether the user clicked on or otherwise expressed interest in any information item (e.g., by hovering over the information item with a mouse device, etc.).

FIG. 1 also shows that the search system 108 receives context information from one or more context-sensing mechanisms 130. Overall, the context information reveals the current contextual setting of the user at a time when the user submits a particular search request. For example, the context information may specify the time at which the user has submitted the search request and the location from which the user has submitted the search request. The context information can also indicate any other context-related metadata values pertaining to the search request, such as the type of user device from which the user submitted the search request, the identities of other people in proximity to the user when the search request was submitted, the relative speed at which the user is currently performing one or more aspects of a search operation and/or other computer-implemented action(s) using the user device 106, and so on.

The above-described context information describes the user's enveloping physical environment. The context information can also specify the relation of each search request to any kind of event that occurs in temporal proximity to the user's submission of the search request. For instance, that event may occur just prior to, during, and/or after the user's submission of the search request. For instance, an event can correspond to: a physical activity performed by the user; another search request or other online action performed by the user; any type of news-related occurrence (e.g., a weather-related occurrence, a traffic-related occurrence, a market-related occurrence, etc.), and so on.

The context-sensing mechanisms 130 can correspond to any devices and services that provide evidence as to the current circumstance of the user. For example, the search system 108 can determine the current time using any digital clock mechanism. The search system 108 can determine the position of the user using any position-sensing mechanism associated with the user device 106 with which the user is interacting, such as any of a GPS mechanism, accelerometer(s), gyroscope(s), magnetometer(s), etc. The search system 108 can determine the identity of other people in proximity to the user using a Near Field Communication (NFC) mechanism provided by the user device 106, and/or by independently determining the positions of the user's contacts and comparing those positions with the user's current position, and so on. The search system 108 can determine temporally proximate events by monitoring the online activity of the user, by monitoring a news feed, and so on.

The search system 108 can leverage the context information in various ways. For example, the query processing component 120 can use the context information to help interpret the meaning of a search request. The retrieval engine 122 can use the context information to help determine the relevance of the search request to an information item under consideration. And the logging component 126 can store context-related metadata values in the data store 128 that collectively describe the circumstance in which each search query has been submitted. For example, without limitation, the logging component 126 can store the date and time that each search query was submitted, the location associated with each search query, the people in the vicinity of the user at the time the search query was made, the relative speed at which the user is performing one or more aspects of a search operation and/or other computer-implemented action(s), and so on.

Although not explicitly illustrated in FIG. 1, the other types of system(s) 114 (besides the search system 108) can store other types of requests (and associated context information) that have been submitted to these systems 114. For example, a word processing application, an online trading application, a communication application, etc., can each store requests that users have submitted to the associated application, along with context-related metadata values associated with each such request. As explained above, the contribution of such other system(s) 114 will be generally omitted below to simplify the description.

Inference System

The inference system 110 analyzes the requests in the query log (and/or the logs associated with any other system(s) 114) to determine patterns associated with those requests. The inference system 110 also determines a response (if any) that the environment 102 should take to each pattern that has been identified. In the terminology used herein, the inference system 110 is said to generate one or more presentation triggers associated with the patterns that have been identified. Each presentation trigger conveys a condition in which the PPS 112 will present a particular action-assistance tool to the user.

For instance, the inference system 110 can determine that a user submits a particular search request to obtain a particular information item (such as a stock price, etc.) on the same day and approximate time each week. The inference system 110 makes this determination by analyzing the user's search requests in relation to the context-related metadata values associated with those search requests (all such information being recorded in the data store 128). In response, the inference system 110 can generate a presentation trigger that causes the PPS 112 to provide an action-assistance tool 104 to the user device just prior to the day and time in which the user typically performs the particular search request. The action-assistance tool 104 can proactively provide a representation of the search request itself. The user may then manually activate the search request to retrieve a corresponding information item. In addition, or alternatively, the action-assistance tool 104 can proactively present the corresponding information item, without requiring the user to activate the search request. In either case, the action-assistance tool 104 reduces the number and/or complexity of manual input actions that a user is required to perform to execute the search request.

FIG. 1 indicates that the inference system 110 can include two principal components: a pattern-detecting component 132 and a conclusion-forming component 134. The pattern-detecting component 132 analyzes the requests and associated context-related metadata values in the data store 128 to identify one or more patterns of user search behavior. The pattern-detecting component 132 then stores pattern information pertaining to the detected pattern(s) in a data store 136. The conclusion-forming component 134 determines what presentation triggers (if any) should be created in response to the detected pattern(s). The conclusion-forming component 134 can make its determinations based on rules provided in a data store 138. Finally, the conclusion-forming component 134 can store trigger information in a data store 140; the trigger information describes the presentation triggers that have been identified. In one case, the data store 140 corresponds to a storage resource that provides a user profile associated with the user who is interacting with the user device 106. Part of the user profile records the trigger information.

In other implementations, the inference system 110 can combine the functions performed by the pattern-detecting component 132 and the conclusion-forming component 134 into an integrated component. For example, as will be described in Subsection A.2, the inference system 110 can use a single machine-trained neural network to map requests into presentation triggers.

Proactive Presentation System (PPS)

The PPS 112 includes a condition-sensing component 142 for sensing context information within the environment 102. The context information reveals the current contextual setting of the user at a current point in time. For example, the context information may specify the current time, the current location of the user, other people (if any) in current proximity to the user, the current activity(ies) of the user, the current user device with which the user is interacting (if any), the relative speed at which the user is currently performing one or more aspects of a search operation and/or other computer-implemented action(s), and so on. The context information may originate from any of the context-sensing mechanisms 130 described above.

A trigger-determining component 144 determines when a trigger condition has been satisfied, which prompts the PPS 112 to send the action-assistance tool 104 to the user device 106. The trigger-determining component 144 operates by retrieving the trigger information from the user's profile (in the data store 138). The trigger information describes one or more presentation triggers. Each presentation trigger is associated with a condition, which specifies a circumstance in which a corresponding action-assistance tool will be presented to the user. The trigger-determining component 144 then compares the current context information with each condition associated with each presentation trigger. If a condition has been met, the trigger-determining component 144 initiates a process to send an appropriate action-assistance tool 104 to the user device 106.

In certain cases, the trigger-determining component 144 cannot assess the context of the user with sufficient confidence. For example, the trigger-determining component 144 may detect that the user is near a particular retail establishment, but may not be able to conclusively determine that the user is within the retail establishment, or headed into the retail establishment. In these circumstances, the trigger-determining component 144 can prompt the user to clarify his or her current context, e.g., by asking the user whether the user is within a retail establishment or headed into the retail establishment. Based on the user's response, the trigger-determining component 144 can then determine whether it is appropriate to present a particular action-assistance tool to the user. The trigger-determining component 144 can also learn from the user's responses to prompts. For example, assume that the user is repeatedly prompted in a given ambiguous context R, and repeatedly provides the same context-clarifying information R'. The trigger-determining component 144 uses the information R' to help interpret the user's context the next time the user enters context R. And with a sufficient number of consistent responses, the trigger-determining component 144 can refrain from prompting the user for clarification in context R.

A presentation component 146 performs the process of generating and sending the action-assistance tool 104. In some cases, the presentation component 146 can generate the action-assistance tool 104 by creating a user interface presentation that includes one or more search requests (e.g., search queries). Alternatively, or in addition, the presentation component 146 can proactively interact with the search system 108 to execute each search request, to provide a corresponding information item, such as a piece of information, a search result page, etc. Then the presentation component 146 can generate a user interface presentation that includes the information item(s). Finally, the presentation component 146 delivers the action-assistance tool 104 to the user device 106, e.g., via the computer network 118.

The presentation component 146 can use different environment and context-specific rules to determine when to display the action-assistance tool 104. In one case, the presentation component 146 displays the action-assistance tool immediately when the condition-sensing component 142 determines that the user has satisfied a condition associated with one of the presentation triggers. In another case, the PPS 112 can make a determination that the user is about to satisfy a condition of one of the presentation triggers. For example, assume that one of the presentation triggers indicates that a particular action-assistance tool should be presented at a certain time, on a certain day of week. The presentation component 146 can be configured to present the action-assistance tool a prescribed amount of time prior to that day and time. In another example, assume that one of the presentation triggers indicates that a particular action-assistance tool is to be presented when the user enters a defined geographic zone. The presentation component 146 can be configured to present the action-assistance tool when the user is a prescribed distance from the geographic zone and is on a trajectory that will lead the user into the geographic zone. The presentation component 146 can determine the user's trajectory by determining the succession of positions over which the user has recently traveled. That is, the presentation component 146 can determine the direction that the user appears to be headed based on the succession of the user's positions; the presentation component 146 can then project the user's path in the identified direction to identify where the user is likely headed. The presentation component 146 can also consider other evidence to determine the likely destination of the user at a given time, such as historical-based movement information that reflects patterns in the user's prior movement.

The PPS 112 can present the action-assistance tool 104 in different application-related contexts. In one case, the PPS 112 can present the action-assistance tool 104 to the user as part of a user interface presentation provided by the search system 108. For example, a search-related user interface presentation can incorporate the action-assistance tool 104 in a peripheral area of the user interface presentation (such as in an upper task bar region). In another case, the PPS 112 can present the action-assistance tool in a user interface presentation provided by PDA system, a gaming system, any application (such as a word processing application), and so on.

In another case, the presentation component 146 can present the action-assistance tool 104 only when the user explicitly asks for it (and only when it is otherwise appropriate to provide the action-assistance tool). In still another case, the presentation component 146 can push a notification to the user device 106 that alerts the user that an action-assistance tool is ready for viewing. The operating system of the user device 106 can show that notification in a peripheral region (e.g., a task bar alert region) of its display surface. In other cases, the presentation component 146 can keep track of system portal(s) and/or application(s) through which a particular user typically receives alerts and messages. The presentation component 146 can then provide the notification via the identified portal(s) and/or application(s).

In any of the above cases, the presentation component 146 can also detect patterns in the portal-related manner in which the user enters particular search requests. For example, assume that the user repeatedly accesses stock quotes for three stocks via a particular system component or application. In response, the presentation component 146 can present an appropriate action-assistance tool that helps the user conduct the particular stock-related search via the same system component or application. The presentation component 146 can present the action-assistance tool in response to the user's interaction with the system component or application, or as a notification to the user. The notification invites the user to view the action-assistance tool via the system component or application.

The above-described presentation modes are cited in the spirit of illustration, not limitation; other implementations can use yet other modes.

Further note that the examples presented herein describe various visual action-assistance tools, e.g., corresponding to a user interface presentation that the user device 106 displays to the recipient-user on a display device of any type. Alternatively, or in addition, the presentation component 146 can present an action-assistance tool having any other form(s) of media content, such as audio content, haptic content, etc.

Having now set forth an overview of the environment 102 as a whole, note that other implementations can vary any aspect(s) of the functionality described above. For example, in the above-described manner of operation, the PPS 112 acts on the presentation triggers that the inference system 110 generates, but the PPS 112 and the inference system 110 otherwise operate in an independent and decoupled manner. But in another implementation, once the PPS 112 determines the current context of the user, the PPS 112 can instruct the inference system 110 to dynamically determine whether there are any pattern(s) and associated presentation trigger(s) for the current context, rather than, or in addition to, retrieving presentation triggers already generated and stored in the data store 140 by the inference system 110. In response to such an instruction, the inference system 110 can cull a group of prior requests that pertain to the user's current context. The inference system 110 can then determine whether this group of requests reveals any pattern(s); if so, the inference system 110 can determine whether it is appropriate to generate any presentation trigger(s) for those pattern(s). In this alternative implementation, the inference system 110 performs its service in a manner that is dynamically tied to instructions from the PPS 112.

Further, FIG. 1 has been described as being made up of the above-described distinct components, including the search system 108, the inference system 110, and the PPS 112. Other implementations can integrate any of these components together in any manner, and/or can integrate any of these components into other system functions, such as a PDA system, a gaming system, etc. To repeat, other implementations can incorporate one or more other types of systems that receive requests from the user, e.g., besides the search system 108.

Further, as described above, the environment 102 generates presentation triggers for each individual user by detecting patterns in the requests submitted by that particular user. For instance, the environment 102 generates a set of zero, one or more presentation triggers for the hypothetical user John Smith based on requests submitted by that user over a span of time. In addition, or alternatively, the pattern-detecting component 132 also identifies group patterns in requests submitted by a group of users. The conclusion-forming component 132 can then generate presentation triggers based on user-specific patterns associated with the particular individual user, John Smith, and/or group patterns associated with an entire group of users.

In some cases, for instance, the inference system 110 can apply a group pattern to strengthen the confidence at which it detects the behavior of a particular user, e.g., John Smith. The inference system 110 may perform this operation upon determining that the user's behavior conforms to others in the group. In other cases, the inference system 110 leverages a group pattern to weaken the confidence at which it detects the behavior of the particular user. The inference system 110 may perform this operation upon determining that the user's behavior contradicts or is otherwise at variance with respect to others in the group. In other cases, the inference system 110 can rely on a group pattern when there is insufficient evidence as to the particular user's own habits.

The inference system 110 can use different rules to select a group for consideration. In one case, the inference system 110 takes into consideration all requests submitted by an entire population of users known to the search system 108. Alternatively, or in addition, the inference system 110 determines a group of users who have similar demographic characteristics and/or behavioral characteristics to the particular user under consideration (e.g., John Smith). The inference system 110 can obtain such characteristic information from the user profiles associated with the respective users.

To facilitate description, many of the examples presented below will continue to describe the operation of the environment 102 in the context of user-specific requests and associated user-specific patterns. But in any such example, the environment 102 can also take into account group actions and group patterns.

Figure 2:
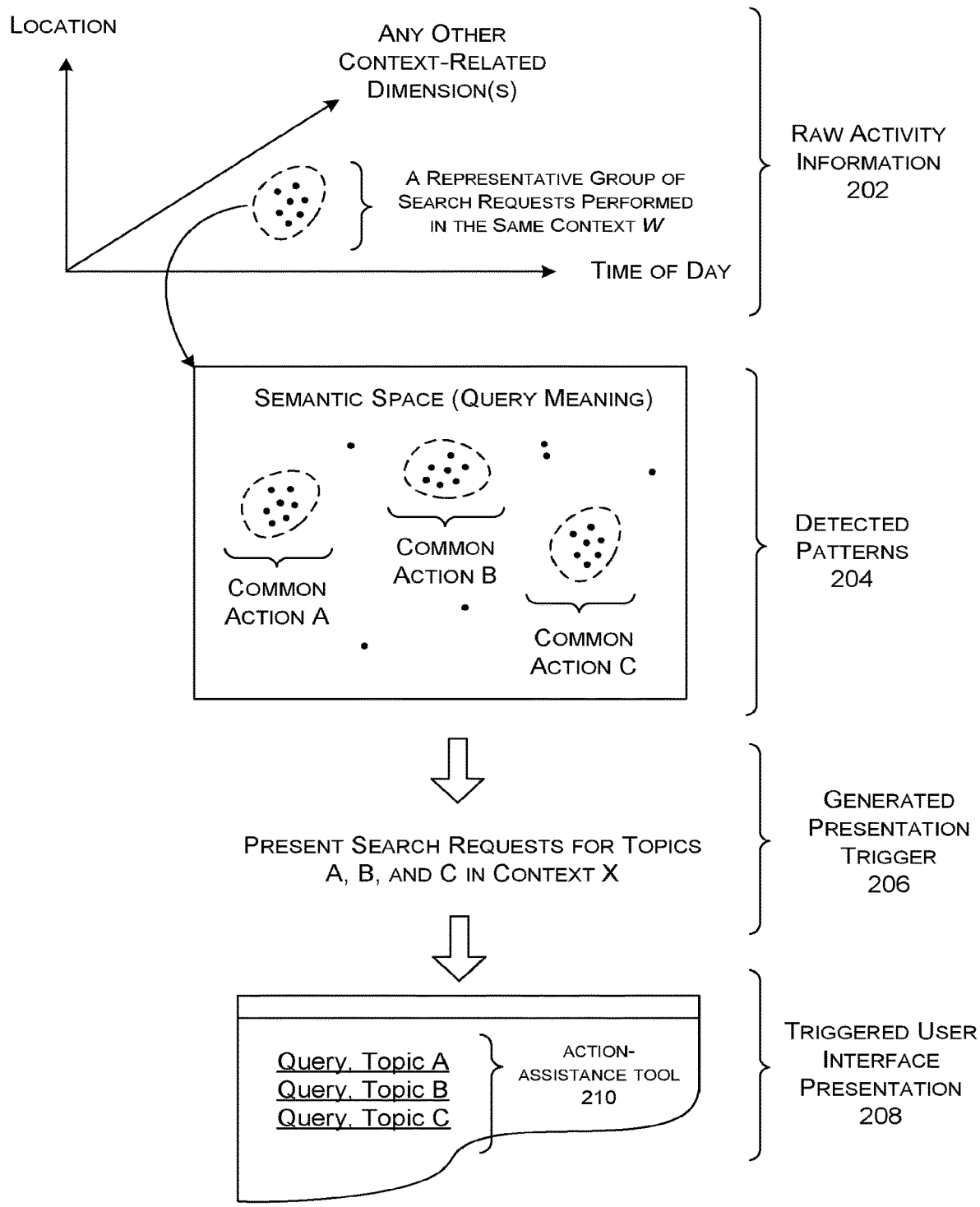
FIG. 2 shows a high-level representation of one manner of operation of the environment of FIG. 1.

FIG. 2 shows a high-level representation of one manner of operation of the environment 102 of FIG. 1, with respect to a particular user. Assume that the search system 108 collects a corpus of raw activity information 202. The raw activity information 202 includes a plurality of requests submitted by the user over a span of time. The raw activity information 202 also includes context information associated with each request, including, for example, a metadata value that describes when the request occurred, where the request occurred, and so on.

The inference system 110 determines one or more patterns 204 in the raw activity information. In one merely illustrative case, assume that the inference system 110 identifies a group of requests performed by the user in the same context W. The context W can be defined with respect to any combination of metadata values, such as the location, and/or time, and/or the co-presence of one or more particular people, etc. Further assume that the inference system 110 determines that there are three semantic topics or intents within the group of requests that occur in the same context W, generically labeled topic A, topic B, and topic C. In response, the inference system 110 generates a presentation trigger 206 that instructs the PPS 112 to present an action-assistance tool when the user next finds himself in context W, in whatever manner context W is defined. Or the presentation trigger 206 may present the action-assistance tool when it is determined that the user is about to enter context W.

FIG. 2 also shows a high-level representation of a user interface presentation 208 that the PPS 112 presents when the user next enters context W. The user interface presentation 208 includes an action-assistance tool 210. Here, the action-assistance tool 210 provides a representation of three search requests, respectively associated with topics A, B, and C.

Figure 3:
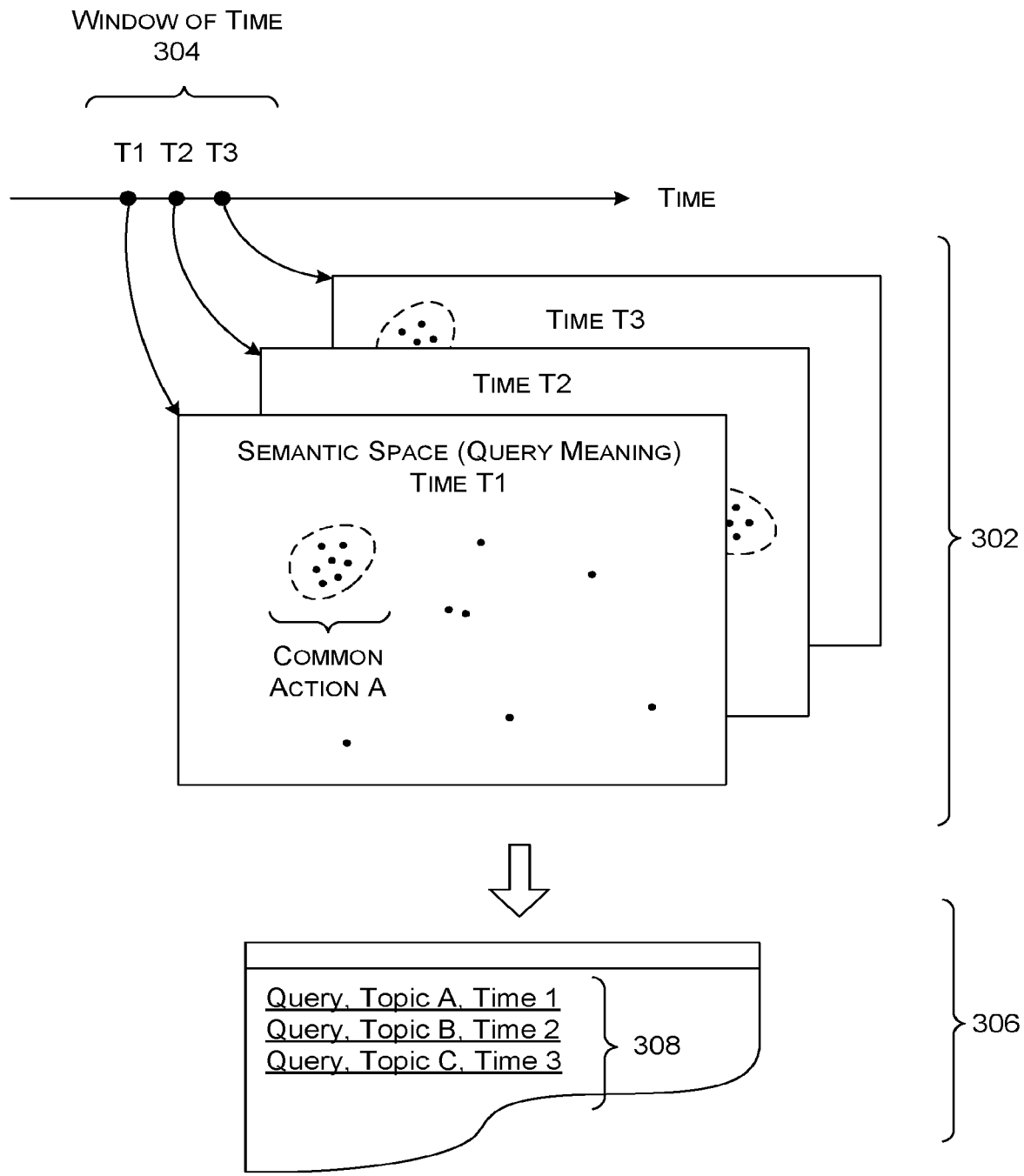
FIG. 3 shows a high-level representation of another manner of operation of the environment of FIG. 1.

FIG. 3 shows a high-level representation of another manner of operation of the environment 102 of FIG. 1, again with respect to a particular user. Again assume that the search system 108 collects a corpus of raw activity information. The raw activity information includes a plurality of requests submitted by the user over a span of time. The raw activity information also includes context information associated with each request.

The inference system 110 determines one or more patterns 302 in the raw activity information. In one merely illustrative case, assume that the inference system 110 identifies a group of requests performed by the user within a window of time 304 (e.g., a 30 minute interval of time), corresponding to a context X. Further assume that the inference system 110 determines that there are three semantic topics or intents within the group of requests that occur in the window of time 304, again generically labeled topic A, topic B, and topic C. In this case, assume that the inference system 110 makes the further determination that the user generally performs requests for topic A in the first 10 minutes of the window of time 304, the user generally performs requests for topic B in the second 10 minute interval within the window of time 304 (e.g., between the 10-minute mark and the 20-minute mark), and the user performs requests for topic C within the last 10 minutes of the window of time 304. In response, the inference system 110 generates a presentation trigger that instructs the PPS 112 to present an action-assistance tool when the user next finds himself in context X. Or the presentation trigger 206 may instruct the PPS 112 to present the action-assistance tool when it is determined that the user is about to enter context X.

FIG. 3 also shows a high-level representation of a user interface presentation 306 that is presented when the user next enters context X. The user interface presentation 306 includes an action-assistance tool 308. Here, the action-assistance tool 308 provides a representation of three requests, respectively associated with topics A, B, and C, or some subset thereof. The action-assistance tool 308 can also optionally order the three requests in the same order in which they occur within the window of time 304. In another scenario, assume that the PPS 112 cannot properly foretell that the user is about to enter context X. When the user does then enter context X (and the PPS 112 detects this fact), the PPS 112 can automatically present an action-assistance tool that assists the user with respect to at least topics B and C. In other words, the PPS 112 can present an abbreviated version of the action-assistance tool 308 shown in FIG. 3.

Figure 4:
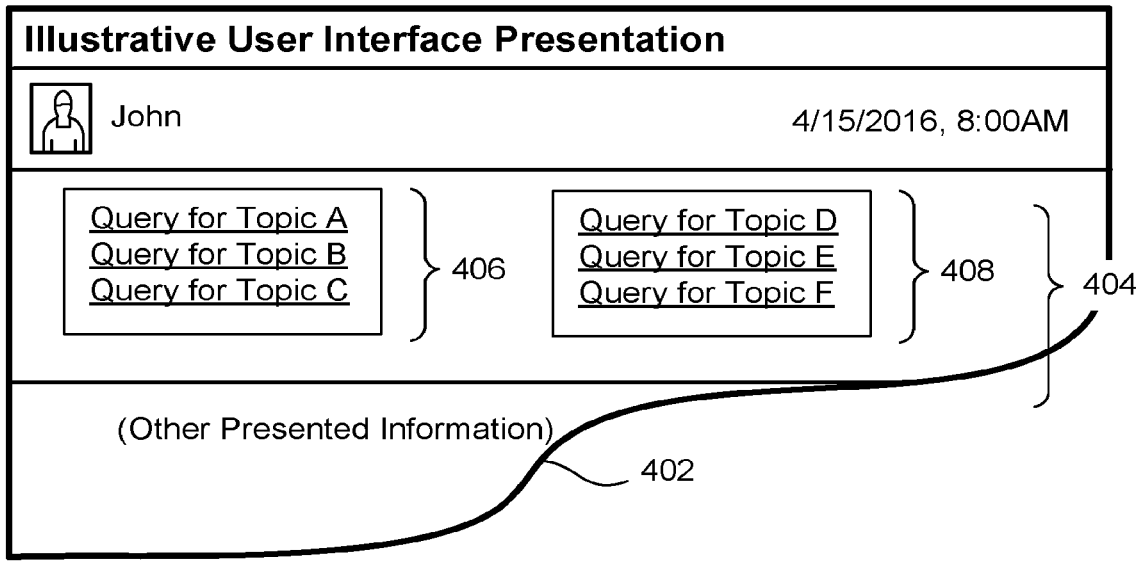
FIGS. 4 and 5 show two respective action-assistance tools that can be presented by the environment of FIG. 1.

FIG. 4 shows another user interface presentation 402 that the PPS 112 can present to a particular user. Here, the inference system 110 determines that the user commonly performs six search requests within a particular context Y. The inference system 110 makes the further determination that the six search requests can be classified into two higher-level semantic categories. Assume, for example, that the first category may pertain to shopping-related request, while the second category may pertain to payment-related requests. Further assume that the user typically performs the first category of requests prior to the second category of requests. In response to these determinations, the inference system 110 generates a presentation trigger that instructs the PPS 112 to present an action-assistance tool 404 when the user enters context Y or is about to enter context Y. The action-assistance tool 404 includes two blocks (406, 408) of requests, corresponding to the above-described two respective categories of requests. The environment 102 presents these requests to the user because it has determined, based on the user's prior behavior, that there is a high probability that the user will perform all or some of the six requests when the user enters context Y.

The inference system 110 can determine the relatedness of two or more requests in different ways. In one approach, the inference system 110 can identify the classification of the interpreted requests in a hierarchical topic-related ontology.

Figure 5:
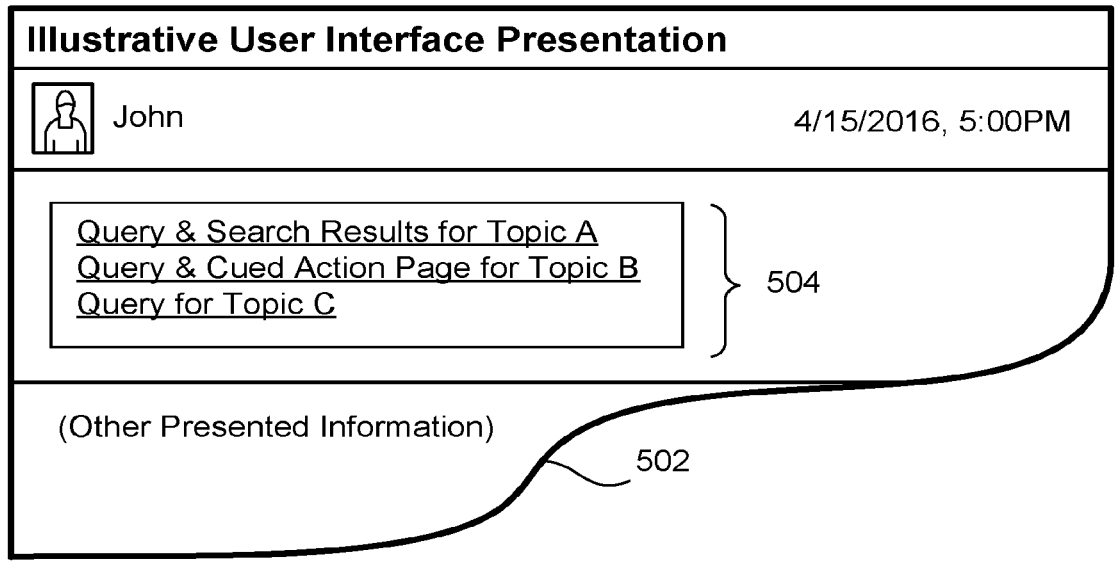

FIG. 5 shows another user interface presentation 502 that the PPS 112 can present to a particular user. Here, the inference system 110 determines that the user commonly performs three search requests within a particular context Z. In response to these determinations, the inference system 110 generates a presentation trigger that instructs the PPS 112 to present an action-assistance tool 504 when the user enters context Z. In this particular case, the action-assistance tool 504 shows both a search request and resultant search results for a topic A. The search results can correspond to a particular piece of information extracted from a particular online site, or may correspond to a search result page, etc. The action-assistance tool 504 also presents a search request and cued action page for topic B. For example, the cued action page may correspond to an order-entry page provided by a shopping system that allows a user to enter an order. Finally, the action-assistance tool 504 presents just the search request for topic C. FIG. 5 therefore makes the general point that the PPS 112 can present different kinds of items in an action-assistance tool. In other words, the environment 102 can provide a representation of any request and/or any result item, where the result item corresponds to an outcome of executing the request; as indicated in FIG. 5, the result item can assume different forms in different respective implementations.

The inference system 110 can use different rules to determine what items to present for each identified pattern. In some cases, the inference system 110 determines what information to present by examining the pattern itself. For instance, assume that the inference system 110 detects that the user has entered the same search request several times on prior occasions in the same context. Further assume that the inference system 110 concludes the user has clicked on a variety of result items in response to that search request. In other words, there is no uniformity in the actions that the user takes after submitting the search request. In this circumstance, the inference system 110 creates a presentation trigger that will cause the PPS 112 to display just the search query, not any of the linked information items.

In another situation, assume that the inference system 110 concludes that the user generally clicks on the same information item after submitting the same search request, e.g., for a high percentage of cases. In response, the inference system 110 can then generate a presentation trigger that instructs the PPS 112 to directly present the information item itself, with or without the corresponding search request.

In another situation, assume that the inference system 110 concludes that the user accesses a particular page of an online service as the final outcome of submitting the same search request. In response, the inference system 110 can generate a presentation trigger that instructs the PPS 112 to directly present a link to that particular page, with or without the corresponding search request.

In addition, or alternatively, the inference system 110 can consult a collection of preference settings for a user under consideration. The preference settings may specify the user's preference as to what type of information is presented in an action-assistance tool. The preference settings can also control any other aspects of the action-assistance tool, such as the timing and other conditions of its presentation, its position within a user interface presentation, its appearance, and so on. The environment 102 honors these preference settings, unless other rules override these preference settings.

This subsection will close with a few concrete scenarios in which the environment 102 can be applied to facilitate a user's computer-implemented actions, such as search actions, service-related actions, etc. In a first scenario, assume that a user repeatedly submits a search request to the search system 108 on every Saturday morning during the winter months to determine the conditions of a mountain pass. The user performs this search because the user travels over the pass to visit family members on every Saturday. To assist the user in retrieving the desired information, the environment 102 can proactively provide an action-assistance tool to the user on every Saturday morning. The action-assistance tool can provide a search query associated with the target topic and/or the desired information item itself. Here, the desired information item corresponds to information regarding the condition of the mountain pass.

In a second scenario, assume that a user frequently submits a search request to the search system 108 when the user visits a particular store. The user makes this search request because he or she wishes to access an online coupon, e.g., because the user often forgets to bring a printed copy of the coupon with him or her to the store. To assist the user in retrieving the desired item, the environment 102 can proactively provide an action-assistance tool to the user each time that the user visits the particular store, regardless of when the user visits the particular store. The action-assistance tool can provide a search query associated with the targeted topic and/or the desired information item (the coupon) itself.

In a third scenario, assume that the user travels on a particular bridge to and from work. Further assume that the bridge sometimes closes down for various reasons. When this happens, assume that the user frequently accesses an online bus schedule, a subway schedule, and a weather report. The user performs these actions because he or she is researching alternative modes to travel to and/or from work. To help the user in these circumstances, the environment 102 can monitor travel alerts provided by a municipal website. In response to an indication that the bridge will be shut down, the environment 102 then provides an action-assistance tool to the user that allows the user to conveniently access the above-described three pieces of information. Note that, in this example, the triggering context-related event pertains to an alert issued by a third-party website, rather than an indication of where the user is currently located and/or the current time. Further note that the inference system 110 has automatically learned the correlation between a bridge-closure event and the user's online behavior, without the user or the third-party website explicitly identifying this bridge-closure event as being important to the user. Indeed, in other circumstances, the correlation between the user's online behavior and other events is sometimes subtle and even counterintuitive. The user may not be consciously aware of such a correlation.

In a fourth scenario, assume that the user sometimes accesses a first shopping site to make a purchase. The user typically makes a purchase by performing the following three activities in sequence. First, the user finds a page associated with a desired product from the first shopping site. Second, the user visits a separate product review site to read reviews regarding the identified product. Third, the user visits another shopping site to determine the price at which that second site offers the same product. The environment 102 can facilitate the user's search by detecting when the user visits the first shopping site. In response, it can present an action-assistance tool that provides a convenient way for the user to access the review-related site and then the second shopping site, and then return to the first shopping site. Moreover, the environment 102 can present these three items in the specified order. Note that, in this example, the triggering context-related event pertains to the user's decision to access the first shopping site. Further note, as already stated above, that the user himself or herself may not be consciously aware of the patterns in his or her behavior.

In a fifth scenario, assume that the user travels on a regular basis during the last week of every month. In preparation for doing so, the user typically visits a group of sites through which he or she makes travel reservations, and other sites that provide review information. In response to detecting this pattern, the environment 102 can provide an action-assistance tool of the type shown in FIG. 4. That action-assistance tool includes a first part that provides items pertaining to reservation-related activities, and a second part that provides items pertaining to review-related sites.

In a sixth scenario, assume that the user accesses an online trading application and sells assets when the market decreases (or increases) by a prescribed amount, such as ten percent. In response to detecting this pattern, the environment 102 can provide an action-assistance tool to the user whenever the market decreases (or increases) by the prescribed amount. The action-assistance tool can present a link to the trading application. In addition, or alternatively, it can present a preconfigured trade page that sets up a trade.

In a seventh scenario, assume that the user frequently sends a message to his or her spouse on Fridays when he or she is about to leave work. In response to detecting this pattern, the environment 102 can present an action-assistance tool when it detects that it is Friday and the user is about to leave work. The action-assistance tool can provide a link to a communication application and/or can present a preconfigured message page. For instance, the action-assistance tool can provide a draft message to the user's spouse, etc.

In an eighth scenario, assume that the user consistently sends a message to meeting attendees when he or she is running late for a meeting (or some other appointment). In this case, the environment 102 can monitor the calendar of the user and the current location of the user (and/or other context-related information, such as user history information). In response to detecting that (a) the user is scheduled to attend a soon-to-occur meeting, and (b) the user currently is not within a prescribed proximity to the location at which the meeting is to be held, the environment 102 can present an action-assistance tool that helps the user send a message to the meeting's attendees.

In a ninth scenario, assume that the user's search requests evince unfamiliarity with the language that the user is using to formulate the search requests, e.g., as when a native French speaker interacts with the search system 108 in the English language. The environment 102 can reach this conclusion based on rules that are configured to detect telltale patterns in the user's search requests, such as telltale grammatical mistakes commonly made by users unfamiliar with a particular natural language. Alternatively, or in addition, the environment 102 can reach this conclusion using a machine-trained statistical model that is configured to detect the user's unfamiliarity with a natural language. Such a statistical model can also detect the user's presumed native language (e.g., French). In response, the environment 102 can present an action-assistance tool that provides, as a supplemental feature, one or more links to language assistance tools that might help the user interact with the environment 102. Such language assistance tools can include a translator application, a language-learning application, etc. In addition, or alternatively, the environment 102 can present information in what is presumed to be the native language of the user, e.g., French.

As evidenced by the above-described examples, this explanation liberally uses the word "request" to refer to any action that the user performs, which causes some computer-implemented functionality to provide some kind of result. In a search-related context, a user may make a request by submitting a search query. A search system responds by providing at least one information item that matches the query. In a communication-related context, the user may make a request by instructing a communication application to send a message, etc. The communication application responds by sending the message.

A.2. The Inference System

Figure 6:
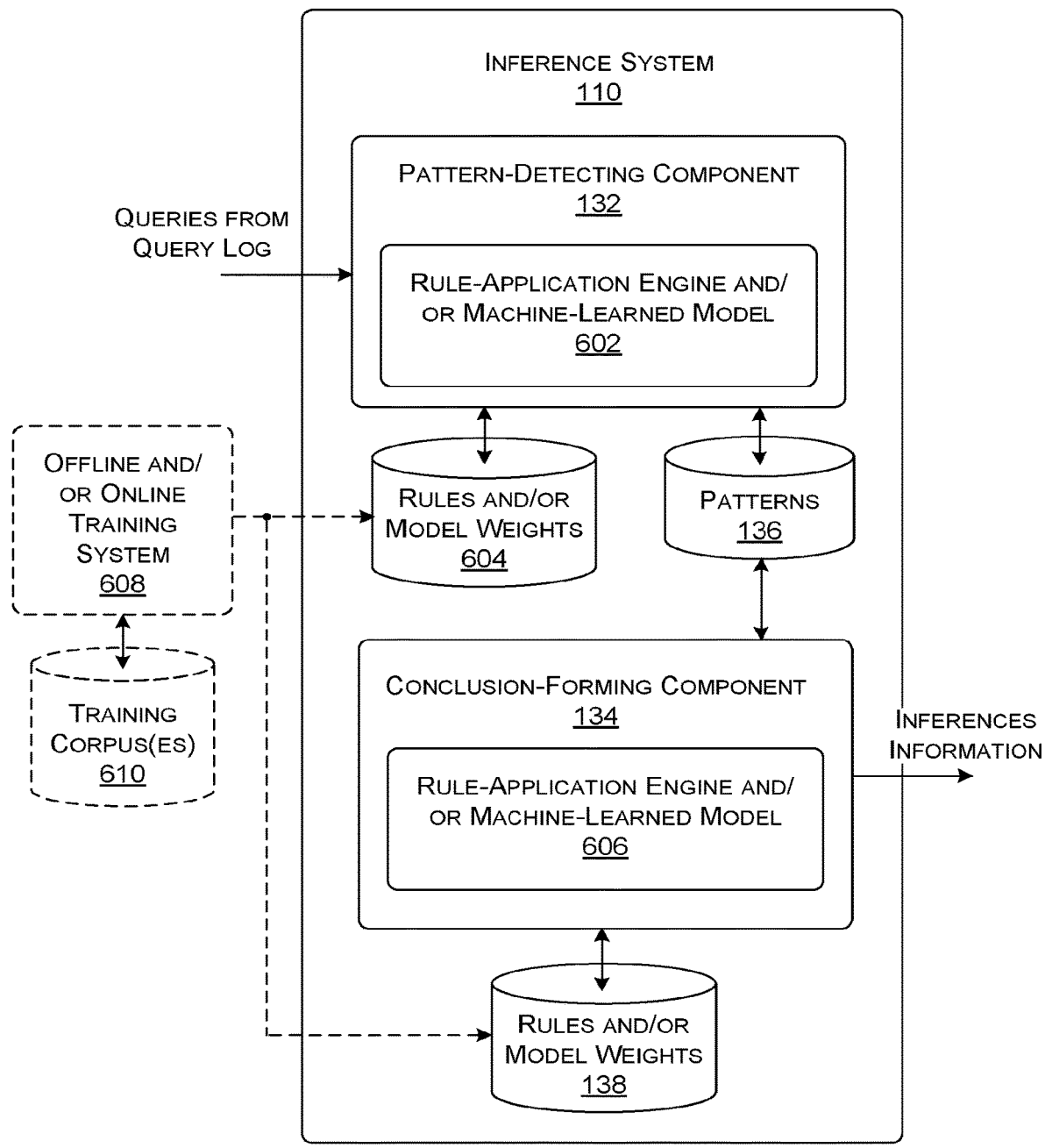
FIG. 6 shows one implementation of an inference system, which is a component of the environment of FIG. 1.

FIG. 6 shows one implementation of the inference system 110 of FIG. 1, which will be explained with reference to the service it provides to a single user. From a high-level perspective, the inference system 110 receives the user's requests from the query log 128 (and/or any other log(s) maintained by the other system(s) 114). The pattern-detecting component 132 determines zero, one or more patterns in the requests. The pattern-detecting component 132 then stores resultant pattern information regarding the detected pattern(s) in the data store 136. The conclusion-forming component 134 next determines zero, one or more presentation triggers in response to the pattern information. Each presentation trigger defines a condition for which a particular type of action-assistance tool will be presented to the user. The conclusion-forming component 134 stores the resultant trigger information in the data store 140 (shown in FIG. 1), which may correspond to a data store that maintains a user profile of the user.

In one implementation, the pattern-detecting component 132 can perform its tasks based on one or more rule-application engines 602. A rule application engine applies one or more rules (such as IF-THEN-structured rules) to detect patterns in the requests. Alternatively, or in addition, the pattern-detecting component 132 can operate using one or more machine-trained models 602. A machine-trained model applies a set of machine-learned weighting values to detect patterns in the requests. A data store 604 stores a collection of rules for use by the rule-application engine(s) 602 and/or the machine-learned weighting values for use by the machine-trained models 602.

In one implementation, the conclusion-forming component 134 can perform its tasks based on one or more rule-application engines 606. Alternatively, or in addition, the conclusion-forming component 134 can operate using one or more machine-trained models 606. The data store 138 stores a collection of rules for use by the rule-application engine(s) 606 and/or the machine-learned weighting values for use by the machined-trained models 606.

An offline (and/or online) training system 608 generates the weighting values for use by the pattern-detecting component 132 and/or the conclusion-forming component 134, if, in fact, these components use machine-trained models. The training system 608 can generate the weighting values using any machine-learning technique (e.g., gradient descent, etc.) based on a corpus of training examples in a data store 610. The training system 608 can produce any type of machine-trained model, such as, without limitation: a logistic regression model; a support vector machine model; a decision tree model; a clustering-type model; a neural network model; a Bayesian network model, and so on.

In one manner of operation, the inference system 110 operates on a periodic basis, such as at the end of every hour, day, week, etc. When invoked, the inference system 110 updates its previous conclusions (if any) as to whether there any pattern(s) in the requests. It performs this task by considering the requests that have been received since it was last invoked, together with its previous conclusions. In another (online) manner of operation, the inference system 110 can operate in the same manner described above, but in a real-time (or near real-time) manner, e.g., by immediately processing the requests as they are provided by the search system 108.

Figure 7:
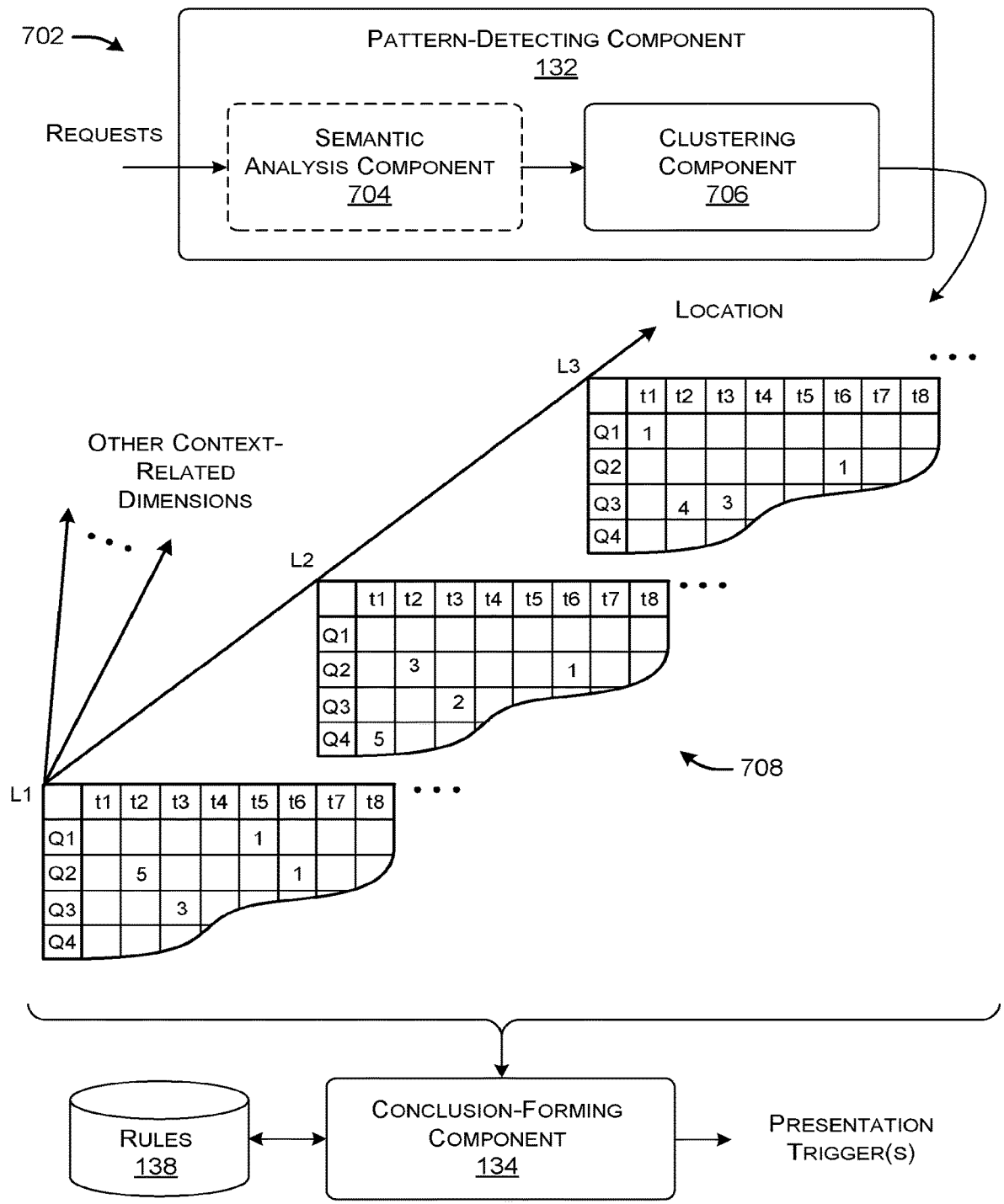
FIG. 7 shows a yet more specific illustrative implementation of the inference system of FIG. 1.

FIG. 7 shows a yet more specific (but non-limiting) implementation 702 of the inference system 110 of FIG. 1. A semantic analysis component 704 determines the meaning of each request that is received from the search system 108. Or the pattern-detecting component 132 can rely on a meaning that is already determined and provided by the search system 108. A clustering component 706 identifies one or more clusters within a collection of requests. Each such cluster corresponds to a set of requests that have the same (or similar) meaning and pertain to the same contextual situation.

In one implementation, the semantic analysis component 704 can use a deep-learning neural network to generate a vector that describes the meaning associated with each request. For example, the neural network can correspond to a feedforward neural network having any number N of layers. The values $z_j$ in any layer j in this feedforward neural network can be given by the formula, $z_j=f(W_j z_{j-1}+b_j)$, for j=2, . . . N. The symbol $W_j$ denotes the j-th weight matrix produced by the training system 608, and the symbol $b_j$ refers to an optional j-th bias vector, also produced by the training system 608. In this implementation, a cluster of queries that have the same (or similar) meaning correspond to queries that map to the same (or similar) high-level vectors in semantic space.

The clustering component 706 can store pattern information in the data store 136 using any data structure. Without limitation, for instance, the clustering component 706 can maintain a data structure 708 in the data store 136 that provides one or more user-specific tables. Each table presents query-vs-time information with respect to a particular location, $L_i$. That is, each table can include a first index that references a set of search requests (queries) that have been received over a span of time, with each query denoted by $Q_j$. More specifically, each query $Q_j$ in a table corresponds to a single search-related meaning, and may encompass different lexical expressions of that meaning. For example, a single weather-related query can encompass the queries "What is the weather in Redmond now?" and "Give me current Redmond weather," etc. In other words, these two lexical expressions have the same or similar high-level vector in semantic space. Each table also includes a second index that references a time-related dimension, with each timeframe $t_k$ describing a span of time during which zero, one or more requests have been submitted.

In the above implementation, the clustering component 706 can operate by incrementing an appropriate count value in an appropriate table when a request has been received. For example, assume that the semantic analysis component 704 determines that a new request pertains to a request having a prescribed meaning, generically denoted as Q2, and that the request is received in a timeframe denoted t2, and at a location denoted L1. In response, the clustering component 706 can increment a value in a cell indexed by a request Q2, a time t2, and a location L1.

In other implementations, the clustering component 706 can use other types of techniques to identify clusters. For example, the clustering component 706 can use any type of clustering algorithm to identify the clusters, such as a k-means clustering technique, any multivariate clustering technique, etc.

The pattern-detecting component 132 can also (or alternatively) generate another data structure (not shown) to detect patterns in requests submitted by a group of users, rather than a particular individual user. In that case, the clustering component 706 can operate by incrementing an appropriate count value in an appropriate group table when any user associated with the group of users makes a request.

The conclusion-forming component 134 interprets the data in the data structure 708 to generate zero, one, or more presentation triggers. For example, in a rule-based approach, the conclusion-forming component 134 can apply a rule that stipulates that a presentation trigger will be generated when any value in a cell in the data structure reaches a prescribed count threshold h, such as five, etc. The presentation trigger for that circumstance will specify that an action-assistance tool will be generated whenever the context associated with the cell is next encountered. For example, note that FIG. 7 shows that five prior requests have been submitted for the query topic Q2 in timeframe t2 and at location L1. When the user is next in timeframe t2 and at location L1, the PPS 112 will generate an action-assistance tool that offers the user the opportunity to invoke a search request associated with the topic Q2, and/or which provides an information item associated with the topic Q2.

Additional environment-specific rules can also play a part in interpreting the data structure 708. For example, another rule can instruct the conclusion-forming component 134 to look for evidence that the request-related activity for a particular request (e.g., request Q2) does not appear to be correlated with location, indicating, for instance, that the user performs the same request Q2 within a certain timeframe (e.g., in timeframe t2) but without regard to the user's location. In response to such a determination, the conclusion-forming component 134 can aggregate all the cell values for Q2 for t2, across different locations, and then compare that aggregate value with the threshold. In this case, location is cited as a variable that does not influence the user's request-related behavior (for Q2); but the same logic can be applied to any other metadata value. For instance, another rule can seek to determine whether a pattern applies to a particular location, but is invariant with respect to time.

Another rule can instruct the conclusion-forming component 134 to look for evidence that a disabling condition is present which would negate the generation of a presentation trigger. For example, assume that the user typically makes a request Q2 in timeframe t2, as indicated above. But further assume that additional evidence indicates that the user does not perform this search when a certain person is located in proximity to the user, such as the user's wife. If the conclusion-forming component 134 determines that this condition is present, it can forgo generating a presentation trigger for this request.

Another rule can interpret a user-specific pattern in light of the behavior of a group of users. The rule can then boost a confidence value associated with a user-specific pattern when the user-specific pattern agrees with the behavior of the group. The rule can decrease the confidence value associated with the user-specific pattern when the user-specific pattern varies from the behavior of the group. Such a rule can determine the degree of influence of the group behavior based on several factors, such as the strength of the user-specific pattern under consideration, the strength of the complementary group pattern, the amount of the evidence that has been collected regarding the user's behavior, and so on.

Another rule can discount each cell value in proportion to elapsed time. For example, such a rule can discount the value of each cell by a factor of 0.90 at the end of each week, month, etc. Such a rule will have the effect of reducing the relevance of each request in inverse proportion to how recent the request has been received. At the same time, the pattern-detecting component 132 will continue to update the data structure 708 as new requests are received; this will allow the data structure 708 to continue to accurately reflect the relevance of active habits of the user, despite the above-described discounting operation.

Another rule can determine the overall composition of each action-assistance tool. For example, another rule can determine whether the user is performing a group of requests pertaining to a set of identified topics in the same contextual situation, where each request has a cell value that satisfies the prescribed threshold. If this determination is made, the conclusion-forming component 134 can generate a presentation trigger which indicates that a resultant action-assistance tool should collectively provide representations of all of the co-occurring search requests (and/or associated information items), e.g., as a bundle, such as the bundle shown in FIG. 2.

Another rule can determine the composition of each element of an action-assistance tool, where each element is associated with a particular request. That rule, for instance, can determine whether the action-assistance tool should present the search request itself (e.g., a query), or an information item associated with the request (e.g., an answer to the query), or both. The conclusion-forming component 134 can make this determination in the manner described above in Subsection A.1, e.g., by determining whether the user's actions evince the consistent selection of the same information item. If this determination is made, the conclusion-forming component 134 can present the information item itself, with or without the search request; if not, the conclusion-forming component 134 can present just the search request.

In another implementation, the pattern-detecting component 132 and/or conclusion-forming component 134 can use a machine-trained statistical model, with or without reliance on the above-described explicit rules. For example, a machine-trained model can perform the same operations as the conclusion-forming component 134 by mapping all or some of the information extracted from the data structure 708 into a representation of one or more presentation triggers. The training system 608 can produce weighting values that implicitly capture the same kind of rules described above in connection with a rules-based version of the conclusion-forming component 134.

In yet another implementation, a single rule-based engine and/or machine-learned model can perform the functions of both the pattern-detecting component 132 and the conclusion-forming component 134. In other words, these two functions need not be performed in the serial manner described above.

In yet another implementation, a single rule-based engine and/or machine learned model can perform the functions of the trigger-determining component 144 (which is a component of the PPS 112), the pattern-detecting component 132 and the conclusion-forming component 134.

A.3. Computing Functionality

Figure 8:
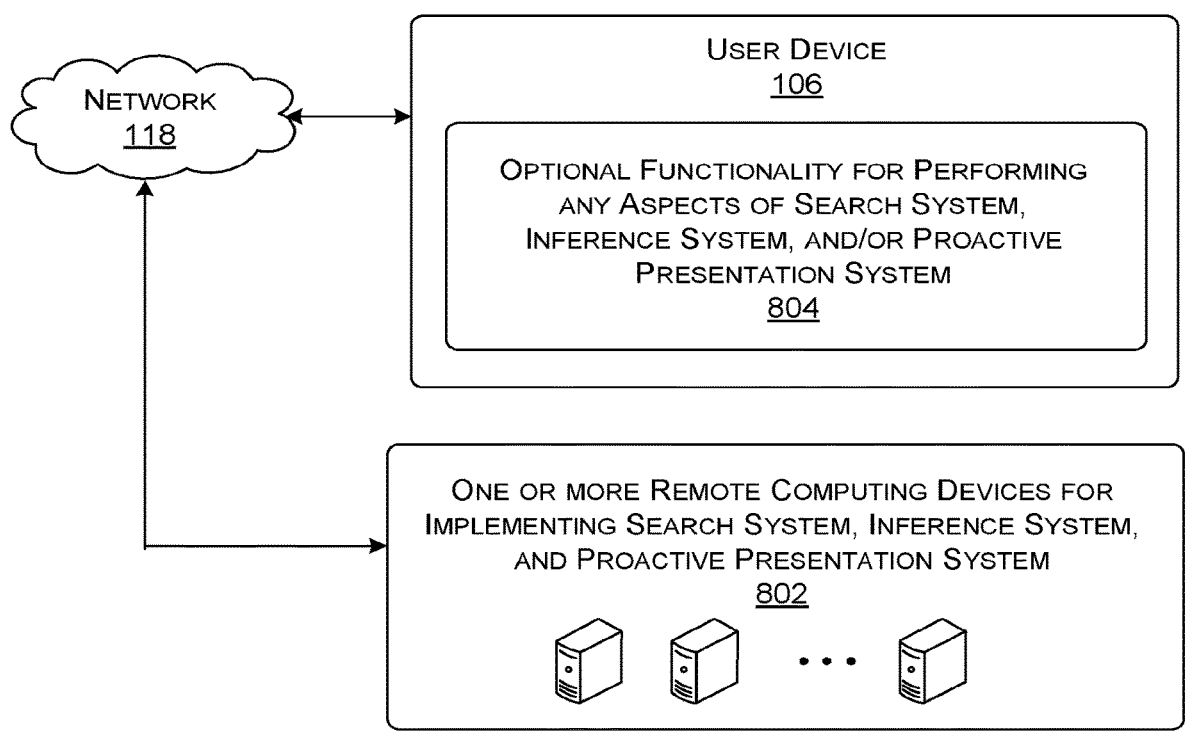
FIG. 8 shows an implementation of the environment of FIG. 1 that uses one or more computing devices.

FIG. 8 shows an implementation of the environment 102 of FIG. 1 that uses one or more computing devices. In one implementation, one or more remote computing devices 802 implement all of the functions of the search system 108, the inference system 110 and the PPS 112. For example, one or more server-type computing devices can perform these functions. The computing devices 802 can be provided at a single location or can be distributed across plural locations. Further, a single entity can administer all of the computing devices 802, or two or more entities can administer different respective computing devices. For instance, two or more entities can administer different systems of the environment 102 shown in FIG. 1, where each system includes one or more computing devices.

The user device 106 can interact with the computing devices 802 via the computer network 118 using a browser application. The user device 106 itself can represent any type of stationary or mobile computing device, such as a stationary personal computing device, a smartphone, a tablet-type computing device, a wearable computing device, and so on.

In another implementation, each user device 106 can include functionality 804 for performing any aspect(s) of the search system 108, the inference system 110, the data store 140, and/or the PPS 112. In another implementation, each user device 106 locally performs all of the functions of the environment 102, thereby entirely dispensing with the use of the remote computing device(s) 802.

Figure 9:
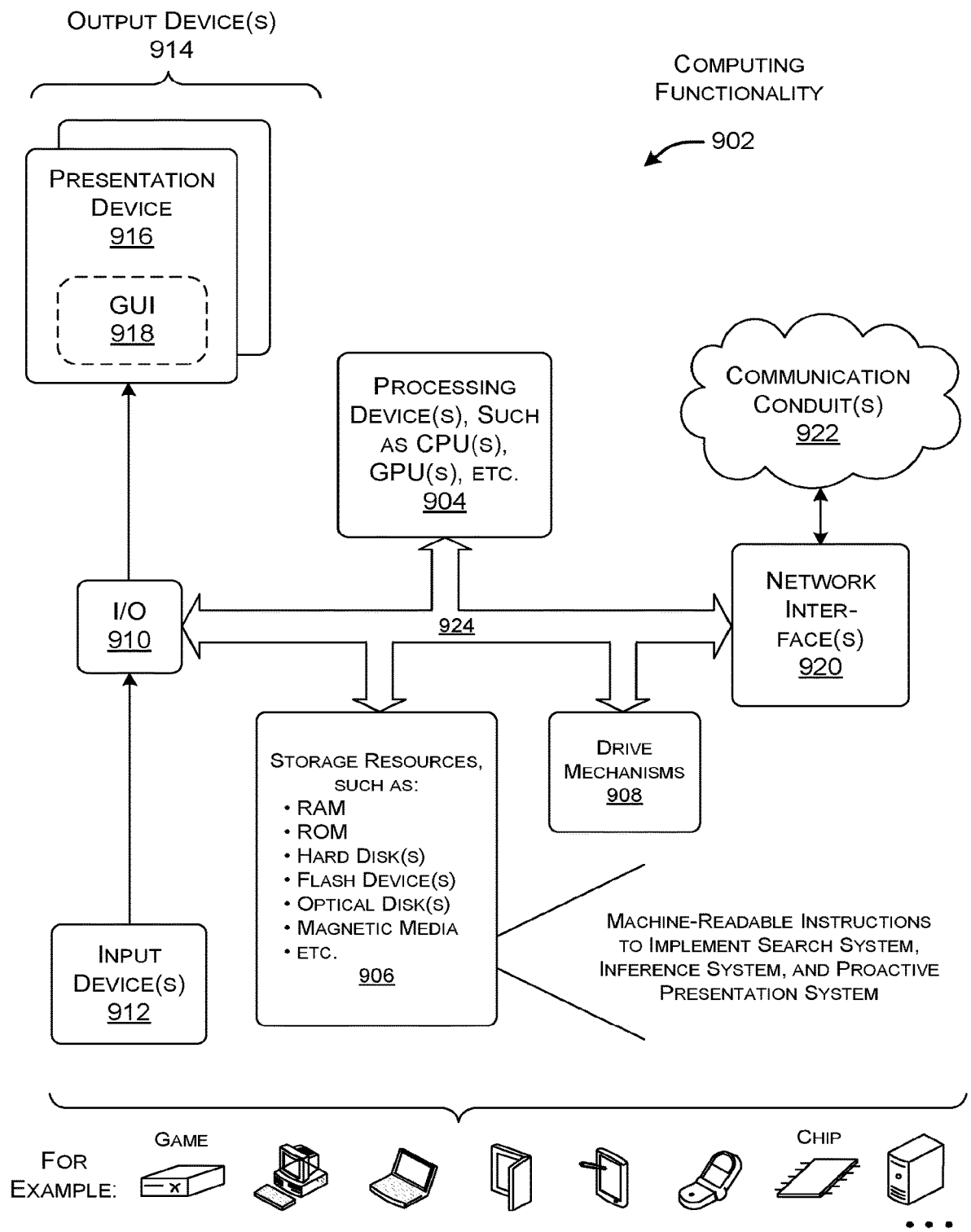
FIG. 9 shows illustrative computing functionality that can be used to implement any aspect of the features shown in the foregoing drawings.

FIG. 9 shows computing functionality 902 that can be used to implement any aspect of the mechanisms set forth in Sections A and B. For instance, the type of computing functionality 902 shown in FIG. 9 can be used to implement each of the user device 106 and/or the remote computing devices 802 of FIG. 8. In all cases, the computing functionality 902 represents one or more physical and tangible processing mechanisms.

The computing functionality 902 can include one or more hardware processor devices 904, such as one or more central processing units (CPUs), and/or one or more graphical processing units (GPUs), and so on. The computing functionality 902 can also include any storage resources (also referred to as computer-readable storage media or computer-readable storage medium devices) 906 for storing any kind of information, such as machine-readable instructions, settings, data, etc. Without limitation, for instance, the storage resources 906 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 902. The computing functionality 902 may perform any of the functions described herein when the hardware processor device(s) 904 carry out computer-readable instructions stored in any storage resource or combination of storage resources. For instance, the computing functionality 902 can carry out the processes described in Section B (below) by executing machine-readable instructions stored in the storage resources 906. The computing functionality 902 also includes one or more drive mechanisms 908 for interacting with any storage resource, such as a hard disk drive mechanism, an optical disk drive mechanism, and so on.

The computing functionality 902 also includes an input/output component 910 for receiving various inputs (via input devices 912), and for providing various outputs (via output devices 914). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 916 and an associated graphical user interface presentation (GUI) 918. The PPS 112 can present the action-assistance tool 104 via the GUI 918. The display device 916 may correspond to a charge-coupled display device, a cathode ray tube device, a projection mechanism, etc. Other output devices include a printer, a model-generating mechanism, a haptic output mechanism, an archival mechanism (for storing output information), and so on. The computing functionality 902 can also include one or more network interfaces 920 for exchanging data with other devices via one or more communication conduits 922. One or more communication buses 924 communicatively couple the above-described components together.

The communication conduit(s) 922 can be implemented in any manner, e.g., by a local area computer network, a wide area computer network (e.g., the Internet), point-to-point connections, etc., or any combination thereof. The communication conduit(s) 922 can include any combination of hardwired links, wireless links, routers, gateway functionality, name servers, etc., governed by any protocol or combination of protocols. The computer network 118 of FIGS. 1 and 8 is a manifestation of the communication conduit(s) 922.

Alternatively, or in addition, any of the functions described in Sections A and B (below) can be performed, at least in part, by one or more hardware logic components. For example, without limitation, the computing functionality 902 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

B. Illustrative Processes

FIGS. 10-13 show processes that explain the operation of the environment 102 of Section A in flowchart form. Since the principles underlying the operation of the environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 10:
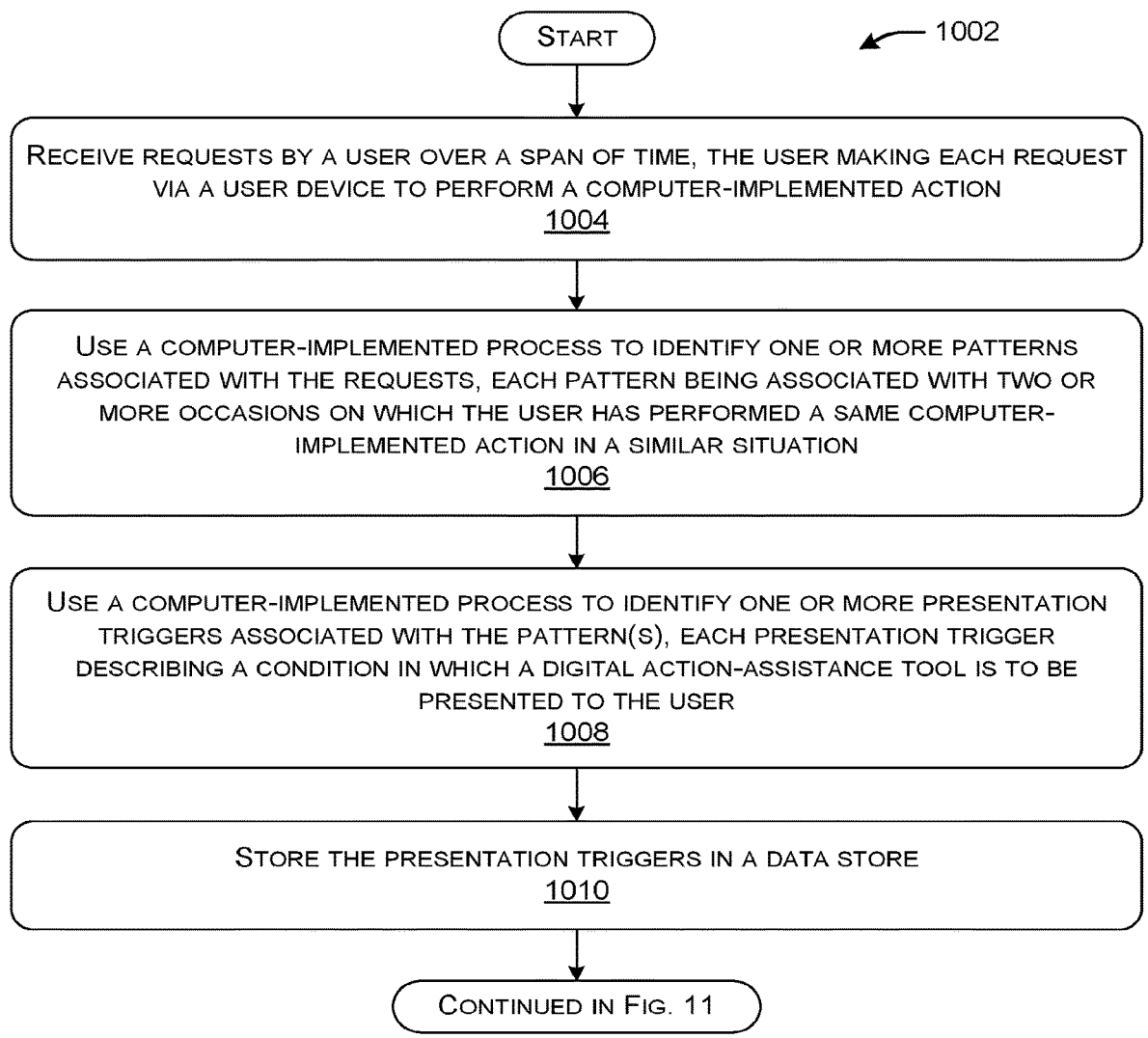
FIGS. 10 and 11 collectively provide a flowchart that shows one manner of operation of the environment of FIG. 1.
Figure 11:
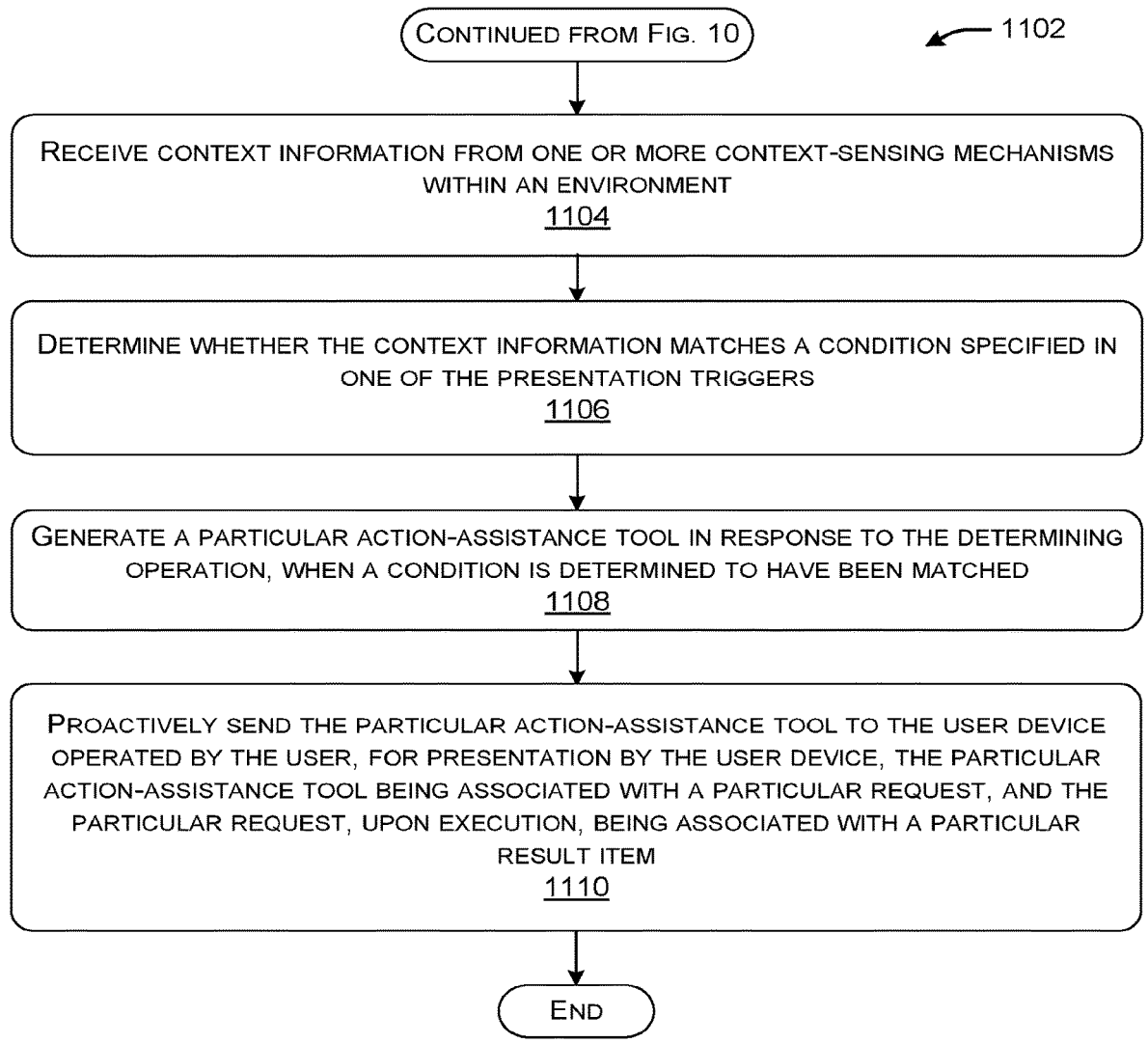

FIGS. 10 and 11 collectively show a process (1002, 1102) that represents one manner of operation of the environment 102 of FIG. 1. In block 1004, the inference system 110 receives requests by a user over a span of time. The user makes each request via the user device 106 to perform a computer-implemented action. In block 1006, the inference system 110 uses a computer-implemented process to identify one or more patterns associated with the requests, each pattern being associated with two or more occasions on which the user has performed a same computer-implemented action in a similar situation. In block 1008, the inference system 110 uses a computer-implemented process to identify one or more presentation triggers associated with the pattern(s). Each presentation trigger describes a condition in which a digital action-assistance tool ("action-assistance tool") is to be presented to the user. In block 1010, the inference system 110 stores the presentation trigger(s) in a data store.

Advancing to FIG. 11, in block 1104, the proactive presentation system (PPS) 112 receives context information from one or more context-sensing mechanisms 130 within an environment. The context information describes the current context of the user. In block 1106, the PPS 112 determines whether the context information matches a condition specified in one of the presentation triggers. The term "matches" as used herein is intended to broadly encompass the case in which the user is already in a target context (e.g., a target timeframe, location, etc.), as well as the case in which the user is expected to soon to "enter" the target context. In block 1108, the PPS 112 generates a particular action-assistance tool in response to the determining operation, that is, when a condition is determined to have been matched. In block 1110, the PPS 112 proactively sends the particular action-assistance tool to the user device 106 operated by the user, for presentation by the user device 106. The particular action-assistance tool is associated with a particular request, and the particular request, upon execution, is associated with a particular result item. The proactively sending operation involves sending the particular action-assistance tool over the communication conduit 118 without requiring the user to manually execute the particular request via the user device, thereby facilitating execution by the user of a particular computer-implemented action associated with the particular request.

Figure 12:
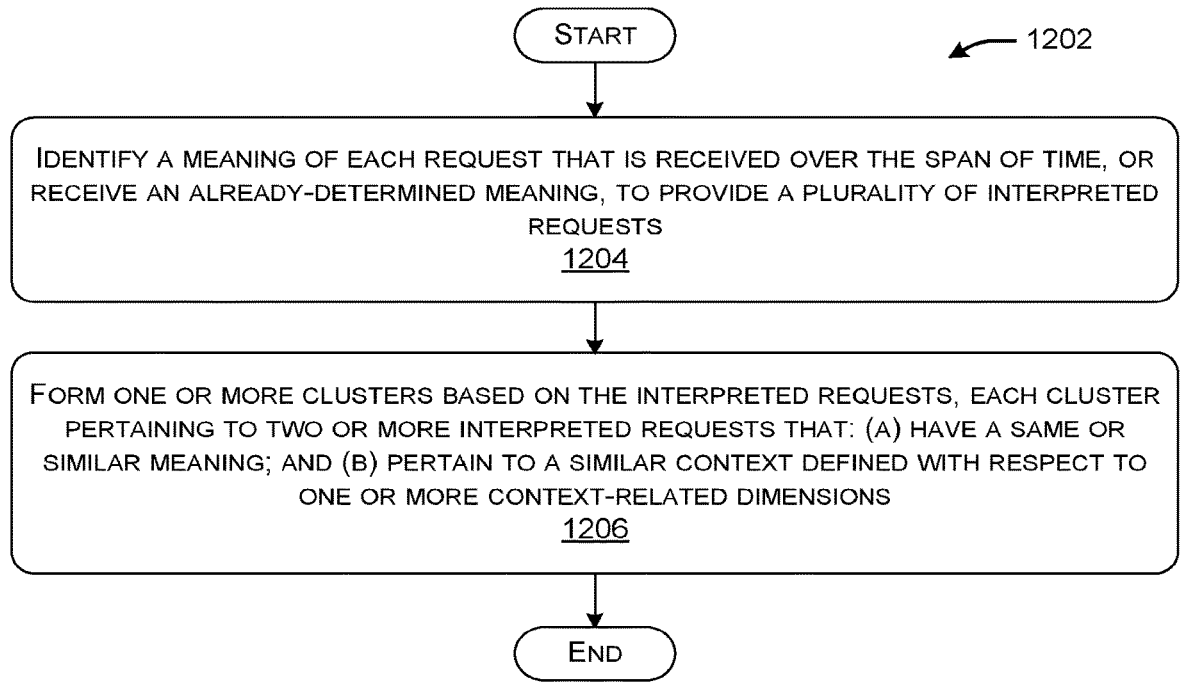
FIG. 12 is a flowchart that shows one manner of operation of the inference system of FIG. 1.

FIG. 12 shows a process 1202 that represents one manner of operation of the inference system 110 of FIG. 1. In block 1204, the inference system 110 identifies a meaning of each request that is received over the span of time. Or the inference system 110 receives an already-determined meaning (e.g., provided by the query processing component 120 of the search system 108). Block 1204 yields a plurality of interpreted requests. In block 1206, the inference system 110 forms one or more clusters based on the interpreted requests, each cluster pertaining to two or more interpreted requests that: (a) have a same or similar meaning; and (b) pertain to a similar context defined with respect to one or more context-related dimensions.

Figure 13:
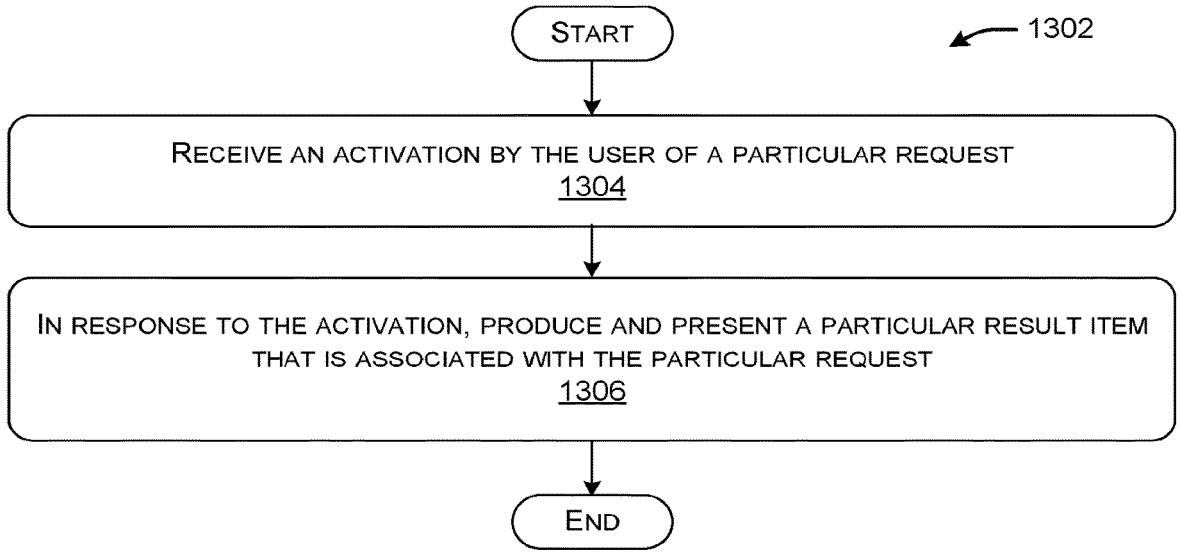
FIG. 13 is a flowchart that shows operations that are performed in response to a user's interaction with an action-assistance tool.

FIG. 13 shows a process 1302 that is performed in response to a user's interaction with an action-assistance tool. In block 1304, the environment 102 receives an activation by the user of the particular request in the action-assistance tool (e.g., when the user activates a representation of a search request in the action-assistance tool). In block 1306, in response to the activation, the environment 102 produces and presents a particular result item that is associated with the particular request.

The following summary provides a non-exhaustive list of illustrative aspects of the technology set forth herein.

According to a first aspect, a method, implemented by one or more computing devices, is described for proactively presenting a digital action-assistance tool to a user. The method includes: receiving requests by a user over a span of time, the user making each request via a user device to perform a computer-implemented action; using a computer-implemented process to identify one or more patterns associated with the requests, each pattern being associated with two or more occasions on which the user has performed a same computer-implemented action in a similar situation; using a computer-implemented process to identify one or more presentation triggers associated with the above-referenced one or more patterns, each presentation trigger describing a condition in which a digital action-assistance tool is to be presented to the user; and storing the above-referenced one or more presentation triggers in a data store. The method also includes: receiving context information from one or more context-sensing mechanisms within an environment, the context information describing a current context of the user; determining whether the context information matches a condition specified in one of the presentation triggers; generating a particular digital action-assistance tool in response to the above-referenced determining, when a condition is determined to have been matched; and proactively sending the particular digital action-assistance tool to the user device operated by the user, for presentation by the user device. The particular digital action-assistance tool is associated with a particular request, and the particular request, upon execution, is associated with a particular result item. The above-referenced proactively sending involves sending the particular digital action-assistance tool over a communication conduit without requiring the user to manually input the particular request via the user device, thereby facilitating execution by the user of a particular computer-implemented action associated with the particular request.

According to a second aspect, the particular computer-implemented action corresponds to: access to a particular information item upon entering a search request via the user device; and/or interaction with a particular service upon entering a service-related request via the user device.

According to a third aspect, the method further includes: receiving requests by a group of users over a span of time, the users making each request via a user device to perform a computer-implemented action; and using a computer-implemented process to identify one or more group patterns associated with the requests received from the group of users, each group pattern being associated with two or more occasions on which the group of users has performed a same computer-implemented action in a similar situation. The also identifies the above-referenced one or more presentation triggers based on the above-referenced one or more group patterns.

According to a fourth aspect, the computer-implemented process to identify the above-referenced one or more patterns includes: identifying a meaning of each request that is received over the span of time, or receiving an already-determined meaning, to provide a plurality of interpreted requests; and forming one or more clusters based on the interpreted requests, each cluster having two or more interpreted requests that: (a) have a same or similar meaning; and (b) pertain to a similar context defined with respect to one or more context-related dimensions.

According to a fifth aspect, the above-referenced one or more context-related dimensions include: a time dimension; and/or a location dimension; and/or a person-proximity dimension; and/or a relative speed dimension corresponding to a relative speed at which the user is performing one or more aspects of a search operation and/or other computer-implemented action(s).

According to a sixth aspect, one of the context-related dimensions defines a window of time, and wherein the above-referenced forming one or more clusters also includes identifying a set of clusters pertaining to the window of time.

According to a seventh aspect, wherein the computer-implemented process to identify the above-referenced one or more patterns and the computer-implemented process to identify the above-referenced one or more presentation triggers correspond to two separate respective processes.

According to an eighth aspect, the computer-implemented process to identify the above-referenced one or more patterns and the computer-implemented process to identify the above-referenced one or more presentation triggers correspond to a single integrated process.

According to a ninth aspect, the computer-implemented process to identify the above-referenced one or more patterns and/or the computer-implemented process to identify the above-referenced one or more presentation triggers are implemented using a rule-based application engine.

According to a tenth aspect, the computer-implemented process to identify the above-referenced one or more patterns and/or the computer-implemented process to identify the above-referenced one or more presentation triggers are implemented using a statistical machine-learned model.

According to an eleventh aspect, the particular digital action-assistance tool provides a representation of the particular request, but not the corresponding particular result item that results from execution of the particular request. The method further includes: receiving an activation by the user of the particular request; and in response to the activation, producing and presenting the particular result item that is associated with the particular request.

According to a twelfth aspect, the particular digital action-assistance tool proactively presents a representation of the particular result item that results from execution of the particular request, without requiring the user to manually activate the particular request.

According to a thirteenth aspect, the computer-implemented process for identifying the above-referenced one or more patterns results in identifying two or more patterns associated with a similar context, wherein the above-referenced two or more patterns are associated with two or more particular requests, each of the above-referenced two or more requests being associated with a particular result item. Further, the particular digital action-assistance tool that is presented provides a bundle that provides a representation of each of the above-referenced two or more particular requests and/or the particular result item associated with each of the above-referenced two or more particular requests.

According to a fourteenth aspect, wherein the above-referenced two or more patterns correspond to two or more clusters of requests that occur in temporal series within the similar context.

According to a fifteenth aspect, the method further includes organizing the above-referenced two or more patterns into at least two groups that pertain to two respective subtopics associated with a same main topic, and demarcating the two groups in the particular digital action-assistance tool.

According to a sixteenth aspect, a system is described for proactively presenting a digital action-assistance tool to a user. The system includes an inference system implemented by one or more computing devices and a proactive presentation system implemented by one or more computing devices. The inference system includes: logic configured to receive requests by a user over a span of time, the user making each request via a user device to perform a computer-implemented action; logic configured to identify one or more patterns associated with the requests, each pattern being associated with two or more occasions on which the user has performed a same computer-implemented action in a similar situation; logic configured to identify one or more presentation triggers associated with the above-referenced one or more patterns, each presentation trigger describing a condition in which a digital action-assistance tool is to be presented to the user; and logic configured to store the above-referenced one or more presentation triggers in a data store. The proactive presentation system includes: logic configured to receive context information from one or more context-sensing mechanisms in an environment; logic configured to determine whether the context information matches a condition specified in one of the presentation triggers; logic configured to generate a particular digital action-assistance tool in response to determining performed by the above-referenced logic configured determine, when a condition has been determined to have been matched; and logic configured to send the particular digital action-assistance tool to the user device operated by the user, for presentation by the user device. The particular digital action-assistance tool is associated with a particular request, and the particular request, upon execution, is associated with a particular result item. The proactive presentation system is configured to proactively send the particular digital action-assistance tool over a communication conduit without requiring the user to manually input the particular request via the user device, thereby facilitating execution by the user of a particular computer-implemented action associated with the particular request.

According to a seventeenth aspect, the particular digital action-assistance tool provides a representation of the particular request, but not the corresponding particular result item that results from execution of the particular request. Further, the system is configured to present the particular result item that is associated with the particular request, upon activation by the user of the particular request.

According to an eighteenth aspect, the particular digital action-assistance tool proactively presents a representation of the particular result item that results from execution of the particular request, without requiring the user to manually activate the particular request.

According to a nineteenth aspect, the above-referenced logic configured to identify the above-referenced one or more patterns results in identifying two or more patterns associated with a similar context. Further, the above-referenced two or more patterns are associated with two or more particular requests, each of the above-referenced two or more requests being associated with a particular result item. Further, the particular digital action-assistance tool that is presented provides a bundle that provides a representation of each the above-referenced two or more particular requests and/or the particular result item associated with each of the above-referenced two or more particular requests.

According to a twentieth aspect, a computer-readable storage medium for storing computer-readable instructions is described. The computer-readable instructions, when executed by one or more processor devices, performs a method that includes: receiving information-related search requests by a user over a span of time, the user making each information-related search request via a user device to access an information item from a repository of searchable information; identifying one or more patterns associated with the information-related search requests, each pattern being associated with two or more occasions on which the user has requested a same information item in a similar situation; identifying one or more presentation triggers associated with the above-referenced one or more patterns, each presentation trigger describing a condition in which a digital action-assistance tool is to be presented to the user; receiving context information from one or more context-sensing mechanisms within an environment; determining whether the context information matches a condition specified in one of the presentation triggers; generating a particular digital action-assistance tool in response to the above-referenced determining, when a condition has been determined to have been met; and proactively sending the particular digital action-assistance tool to the user device operated by the user, for presentation by the user device. The particular digital action-assistance tool is associated with a particular information-related search request, and the particular information-related search request, upon execution, is associated with a particular information item. Further, the particular digital action-assistance tool provides a representation of the particular information-related search request and/or the particular information item. Further, the above-referenced proactively sending involves sending the particular digital action-assistance tool without requiring the user to manually input the particular information-related search request via the user device.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
   receiving a plurality of similar, manually-inputted requests from a user device to perform a computer-implemented action, each of the plurality of similar, manually-inputted requests having been manually input into the user device by a user at a past time when a time condition was satisfied by past time context information;
   detecting a pattern from the plurality of similar, manually-inputted requests by the user from the user device, the pattern detected based at least on the past time context information that satisfied the time condition when each similar manually-inputted request of the plurality of similar manually-inputted requests was received;
   based at least on the pattern of similar, manually-inputted requests by the user from the user device, automatically generating a trigger describing the time condition, the trigger generated by analyzing historical behavior data by the user to identify a time-dependent pattern, indicating a time in which the user typically manually inputs a request to perform the computer-implemented action, and generating the trigger based on the identified time-dependent pattern, the trigger being associated with an action-assistance tool that facilitates an execution of at least a part of the computer-implemented action;
   receiving current time context information;
   determining that the trigger has been met based at least on the current time context information satisfying the time condition; and
   in response to determining that the current time context information satisfies the time condition, commencing performance of the computer-implemented action without receiving an input by the user at a time subsequent to receiving the plurality of similar manually-inputted requests and regarding performance of the computer-implemented action and just prior to the time, indicated by the time-dependent pattern, in which the user typically manually inputs the request to perform the computer-implemented action, the performance of the computer implemented action commenced by proactively causing the action-assistance tool to automatically carry out a new request to perform the computer-implemented action.

2. The method of claim 1, wherein the computer-implemented action includes:
   presenting an information item upon receiving a search request via the user device; and/or
   enabling an interaction with a service upon receiving a service-related request via the user device.

3. The method of claim 1, further comprising:
   receiving a group comprising multiple pluralities of similar manually-inputted requests to perform a computer-implemented action, each plurality of the group received from a user device and comprising multiple requests with each request being manually-inputted into the user device by the user at a corresponding past time when the time condition was satisfied by the past time context information;
   determining a group pattern associated with the group of pluralities; the group pattern being associated with at least two of the pluralities of the group; and
   wherein the trigger is generated based at least on the group pattern.

4. The method of claim 1, wherein detecting the pattern comprises:
   for each of the plurality of similar manually-inputted requests, determining an interpreted request based on a semantic meaning of the manually-inputted request, thereby forming a plurality of interpreted requests; and
   determining, using a clustering algorithm, one or more clusters based on the plurality of interpreted requests, each cluster having at least two interpreted requests that: (a) have a similar meaning; and (b) pertain to a similar time context.

5. The method of claim 1, wherein the pattern is detected and/or the trigger is generated using a rule-based application engine.

6. The method of claim 1, wherein the pattern is detected and/or the trigger is generated using a statistical machine-learned model.

7. The method of claim 1, wherein the action-assistance tool presents, on the user device, a result from the performance of the computer-implemented action.

8. The method of claim 1, wherein the action-assistance tool presents, on the user device, a representation of the request to perform the computer-implemented action at the time condition.

9. The method of claim 1:
   wherein each of the plurality of similar, manually-inputted requests was manually input into the user device by the user when a location condition was satisfied by a location context; and
   further comprising:
   detecting a second pattern from the plurality of similar, manually-inputted requests by the user from the user device, the second pattern detected based at least on the location context that satisfied the location condition when each similar, manually-inputted request, of the plurality of similar manually-inputted requests, was received; and
   wherein the trigger is automatically generated based at least on the second pattern.

10. The method of claim 9 wherein the trigger is determined to be met when the current time context satisfies the time condition and/or when a current location context satisfies the location condition.

11. The method of claim 1, wherein the computer-implemented action comprises: performing a search, checking road conditions, checking weather, checking a schedule, shopping online, booking a reservation, trading assets, sending an electronic communication, using a language-assistance tool, or executing a financial transaction.

12. A system, comprising:
one or more hardware processor devices; and
a computer-readable storage medium storing instructions which, when executed by the one or more hardware processor devices, cause the one or more hardware processor devices to perform operations comprising:
receive a plurality of similar, manually-inputted requests from a user device to perform a computer-implemented action, each of the plurality of similar manually-inputted requests having been manually input into the user device by a user on an occasion;
determining a time-dependent pattern, from the plurality of similar manually-inputted requests by a user from a user device, the time-dependent pattern indicating a time in which the user typically manually inputs a request to perform the computer-implemented action and determined based at least on a context condition that was satisfied on the occasion that each of the plurality of similar manually-inputted requests was received;
receive current context information;
determine that the current context information satisfies the context condition; and
in response to determining that the current context information satisfies the context condition, commencing performance of the computer-implemented action without receiving an input by the user at a time subsequent to receiving the plurality of similar manually-inputted requests and regarding performance of the computer-implemented action and just prior to the time, indicated by the time-dependent pattern, in which the user typically manually inputs the request to perform the computer-implemented action, the performance of the computer implemented action commenced by executing an action-assistance tool to automatically carry out a new request to perform the computer-implemented action; and
cause to present, on the user device, a result from performing the computer-implemented action.

13. The system of claim 12 wherein the context condition comprises at least one of a date condition, a location condition, a user device type from which the user manually inputted each request; and at least one person in proximity to the user when the user manually inputted each request.

14. The system of claim 12 wherein the pattern is determined based on a context condition that comprises at least two of: a date condition, a location condition, a user device type from which the user manually inputted each request; and at least one person in proximity to the user when the user manually inputted each request.

15. The system of claim 12, wherein the computer-implemented action comprises: performing a search, checking road conditions, checking weather, checking a schedule, shopping online, booking a reservation, trading assets, sending an electronic communication, using a language-assistance tool, or executing a financial transaction.

16. The system of claim 12, wherein the operations further comprise cause to present, on the user device, a representation of the request to perform the computer-implemented action at the context condition.

17. The system of claim 12 wherein determining the pattern comprises:
for each of the plurality of similar manually-inputted requests, determining an interpreted request based on a semantic meaning of the manually-inputted request, thereby forming a plurality of interpreted requests; and
determining, using a clustering algorithm, one or more clusters based on the plurality of interpreted requests, each cluster having at least two interpreted requests that: (a) have a similar meaning; and (b) pertain to a similar context condition.

18. The system of claim 12, wherein the pattern is determined using a rule-based application engine or a statistical machine-learned model.

19. A computer-readable storage medium storing computer-readable instructions, the computer-readable instructions, when executed by one or more processor devices, cause the one or more processor devices to perform operations comprising:
receive a plurality of similar, manually-submitted search requests from a user device to access an information item from a repository of searchable information, each of the plurality of similar, manually-submitted search requests having been manually submitted by a user via the user device at a particular occasion including a context;
detect a pattern associated with the plurality of similar, manually-submitted search requests submitted by the user via the user device, the pattern being associated with at least two of the particular occasions on which access of the information item was manually requested, each occasion including the context;
based at least on the detected pattern associated with the plurality of similar, manually-submitted search requests submitted by the user via the user device, programmatically determine a trigger specifying a context condition that was satisfied in the past context when each of the plurality of similar, manually-inputted search requests were manually submitted, the trigger determined by analyzing historical behavior data by the user to identify a time-dependent pattern, indicating a time in which the user typically manually inputs a search request, and generating the trigger based on the identified time-dependent pattern, the trigger being associated with a tool that facilitates carrying out a search request to access the information item;
receive current context information;
determine that the current context information satisfies the context condition specified in the trigger; and
in response to a determination that the current context information satisfies the context condition, proactively and without receiving a user input regarding a request to access the information item, send the tool to the user device, the tool being sent without having received the user input subsequent to receiving the plurality of similar manually-submitted search requests from the user device, and just prior to the time, indicated by the time-dependent pattern, in which the user typically manually inputs the search request, wherein the user input is regarding the request to access the information item, and wherein the tool causes an automatic presentation of a representation of the search request to access the information item.

20. The computer-readable storage medium of claim 19:
wherein the context condition comprises at least one of a date condition, a location condition, a user device type from which the user manually inputted each request; and at least one person in proximity to the user when the user manually inputted each request;
wherein detecting the pattern comprises:
for each of the plurality of similar manually-submitted search requests, determine an interpreted request based on a semantic meaning of the manually-submitted search request, thereby forming a plurality of interpreted requests; and
determine, using a clustering algorithm, one or more clusters based on the plurality of interpreted requests, each cluster having at least two interpreted requests that: (a) have a similar meaning; and (b) pertain to a similar context condition; and
wherein the pattern is detected using a rule-based application engine or a statistical machine-learned model.

* * * * *